United States Patent
Oka

(10) Patent No.: US 8,243,842 B2
(45) Date of Patent: Aug. 14, 2012

(54) SIGNAL SEPARATING DEVICE AND SIGNAL SEPARATING METHOD

(75) Inventor: Naoto Oka, Kanagawa (JP)

(73) Assignee: Panasonic Corporation, Osaka (JP)

( * ) Notice: Subject to any disclaimer, the term of this patent is extended or adjusted under 35 U.S.C. 154(b) by 751 days.

(21) Appl. No.: 12/442,573

(22) PCT Filed: Sep. 25, 2007

(86) PCT No.: PCT/JP2007/068542
§ 371 (c)(1),
(2), (4) Date: May 7, 2009

(87) PCT Pub. No.: WO2008/038626
PCT Pub. Date: Apr. 3, 2008

(65) Prior Publication Data
US 2010/0086067 A1    Apr. 8, 2010

(30) Foreign Application Priority Data
Sep. 25, 2006    (JP) .................................. 2006-259710

(51) Int. Cl.
*H04B 7/02*    (2006.01)
(52) U.S. Cl. ........ 375/267; 375/341; 375/260; 375/299; 375/295; 375/340; 455/101
(58) Field of Classification Search .................. 375/341, 375/260, 367, 299, 295, 340; 455/101
See application file for complete search history.

(56) References Cited

U.S. PATENT DOCUMENTS

| | | | |
|---|---|---|---|
| 7,489,746 B1 * | 2/2009 | Awater et al. ................. | 375/341 |
| 2004/0174939 A1 * | 9/2004 | Wang ............................ | 375/316 |
| 2005/0091697 A1 | 4/2005 | Tanaka et al. | |
| 2005/0152484 A1 * | 7/2005 | Sandhu et al. ................. | 375/347 |
| 2006/0251061 A1 * | 11/2006 | Kim et al. ..................... | 370/366 |
| 2007/0116143 A1 * | 5/2007 | Bjerke et al. .................. | 375/262 |
| 2007/0233470 A1 * | 10/2007 | Goto et al. .................... | 704/208 |
| 2007/0291882 A1 * | 12/2007 | Park et al. ..................... | 375/347 |

(Continued)

FOREIGN PATENT DOCUMENTS

| | | |
|---|---|---|
| JP | 2006-121348 | 5/2006 |
| JP | 2006-157390 | 6/2006 |
| WO | 2006/043369 | 4/2006 |
| WO | 2006/070438 | 7/2006 |

OTHER PUBLICATIONS

English language Abstract of JP 2006-157390, Jun. 15, 2006.

(Continued)

*Primary Examiner* — Kenneth Lam
(74) *Attorney, Agent, or Firm* — Greenblum & Bernstein, P.L.C.

(57) ABSTRACT

A signal separating device the computational complexity of which is reduced and the communication quality of which is improved. A channel matrix interchanging section (110) creates matrices defined by interchanging the elements of channel estimation matrices multiplied by symbol candidates relevant to the final stage. A QR separating/QH multiplying sections (121, 122) each perform QR separation by using the created matrices and perform multiplication of the transposed matrix of the Q matrix of each created matrix by the received signal. At the final stage, the maximum likelihood judging sections (131, 132) each calculate only the value representing the squared Euclidean distance between the signal point when the combination of the symbol candidates until the final stage is fixed and the candidate point relevant to the final state nearest to the signal point by using the results of the computations by the QR separating/QH multiplying sections (121, 122), thus reducing the computational complexity while preventing absence of the bit likelihood.

4 Claims, 9 Drawing Sheets

U.S. PATENT DOCUMENTS

2008/0095257 A1* 4/2008 Maeda et al. .................. 375/262
2009/0117862 A1* 5/2009 Le Nir et al. .................. 455/101

OTHER PUBLICATIONS

Meda et al., QRM-MLD o Mochiiru VSF-Spread OFDM MIMO Taju ni Okeru Sohoko Soshin Shingo Ranking-ho, IEICE Technical Report, Oct. 23, 2004, vol. 104, No. 400, pp. 33-38, RCS2004-206.

Meda et al., . QRM-MLD o Mochiiru OFCDM MIMO Taju ni Okeru Sohoko Soshin Shingo Ranking-ho, 2004 IEICE Communications Society Taikai Koen Ronbunshu 1, Sep. 8, 2004, p. 342.

Kawai et al., "Adaptive Control of Surviving Symbol Replica Candidates in QRM-MLD for OFDM MIMO multiplexing", IEEE Journal on Selected Areas in Communications, vol. 24, No. 6, Jun. 2006, pp. 1130-1140, ISSN: 0733-8716.

* cited by examiner

SIGNAL SEPARATING DEVICE AND SIGNAL SEPARATING METHOD

TECHNICAL FIELD

The present invention relates to a signal demultiplexing apparatus and signal demultiplexing method. More particularly, the present invention relates to a signal demultiplexing apparatus and signal demultiplexing method used in a radio receiving apparatus of the MIMO (Multi-Input Multi-Output) scheme.

BACKGROUND ART

Patent Document 1 discloses a receiver that carries out signal demultiplexing according to a conventional QRM-MLD method (maximum likelihood detection (MLD)) method using QR decomposition and M algorithm). As shown in FIG. 1, the receiver disclosed in Patent Document 1 has: a plurality of receiving antennas 10-1, 10-2, 10-3 and 10-4; channel estimation section 20; ranking section 30; rearranging section 40; QR decomposition section 50; signal converting section 60; maximum likelihood detection section 70; and likelihood outputting section 80. Maximum likelihood detection section 70 has four deciding sections 72-1, 72-2, 72-3 and 72-4. The number of deciding sections is determined according to the number of transmission signals.

The deciding sections have similar processing blocks, and so fourth deciding section 72-4 will be described as a representative of these deciding sections. The deciding section has symbol replica generating section 74-4, square Euclidean distance calculating section 76-4 and surviving symbol candidate selecting section 78-4. Here, assume that signals $x=(x_1 \ldots x_4)^T$ are each transmitted from four transmitting antennas by 16 QAM modulation scheme (where the superscript letter symbol T stands for the transpose.). Signal x is referred to as "a transmission signal vector" and forms one symbol. $x_1$, $x_2$, $x_3$ and $x_4$ are referred to as "transmission signals" or "vector components."

Channel estimation section 20 finds a channel impulse response value (CIR) or channel estimation value based on received signals including the pilot signal known both on the transmitting side and receiving side. Matrix H using channel estimation value $h_{nm}$ as a matrix element, is referred to as a "channel matrix." Note that $h_{nm}$ represents the channel estimation value between the m-th transmitting antenna and n-th receiving antenna.

Ranking section 30 rates or ranks a plurality of received signals $y_1 \ldots y_4$ in order of the magnitude of power.

Rearranging section 40 reports the order a plurality of received signals are arranged, to QR decomposition section 50 and signal converting section 60.

QR decomposition section 50 finds matrices Q and R such that channel matrix H determined in channel estimation section 20 is represented as a product of unitary matrix Q and upper triangular matrix R (H=QR). Unitary matrix Q in this case satisfies $Q^H Q = QQ^H = I$, and may be a square matrix or include different numbers of rows and columns. The superscript letter H represents the conjugate transpose and I represents the unit matrix.

Signal converting section 60 carries out signal conversion by multiplying received signal vectors $y=(y_1, \ldots, y_4)^T$ by conjugate transpose matrix $Q^H$ of unitary matrix Q. y=Hx=QRx holds between transmission signals and received signals. When $Q^H$ is multiplied upon this equation from the left, $Q^H y = z$ holds in the left side and $Q^H QRx = Rx$ holds in the right side, so that the relationship between transmission signals and received signals can be represented by, for example, z=Rx. However, $z=(z_1 \ldots z_4)^T = Q^H y$ holds. z is referred to as "received signal vectors after unitary conversion."

Elements of received vector z can be represented as $z_1 = r_{11}x_1 + r_{12}x_2 + r_{13}x_3 + r_{14}x_4$, $z_2 = r_{22}x_2 + r_{23}x_3 + r_{24}x_4$, $z_3 = r_{33}x_3 + r_{34}x_4$ and $z_4 = r_{44}x_4$.

Maximum likelihood detection section 70 narrows down candidates for a transmission signal (also referred to as "symbol candidates"), that is, decreases the number of candidates, by the maximum likelihood detection method (MLD method). Symbol replica generating section 74-4 of deciding section 72-4 generates candidates of a transmission signal associated with received signal $y_4$, using the matrix elements of upper triangular matrix R. The number of candidates is c, for example, and is set fixedly.

Square Euclidean distance calculating section 76-4 calculates square Euclidean distances between converted received signal $z_4$ and C signal point candidates. The square Euclidean distances represent the metric used as the base of likelihood calculation. Candidates of shorter square Euclidean distances are decided to be closer to the transmitted symbol.

Surviving symbol candidate selecting section 78-4 outputs $S_1$ ($\leq C$) candidates as surviving candidates based on the square Euclidean distances with respect to the candidates.

Likelihood outputting section 80 calculates the likelihoods or reliabilities of the candidates outputted from the surviving symbol candidate selecting section in the final stage. To be more specific, these likelihoods are represented by log likelihood ratios (LLR's). Outputs from likelihood outputting section 80 represent signal demultiplexing results and are transmitted to a subsequent demodulating section (for example, turbo decoder).

The operation will be described next. The receiver receives transmission signals as received signals $y_1$ to $y_4$ at four receiving antennas. These received signals are delivered to channel estimation section 20 and signal converting section 60. The order a plurality of received signals are arranged, is determined by channel estimation section 20, ranking section 30 and rearranging section 40. Here, the received signals are aligned in order of the magnitude of received power, and, for ease of description, assume that received power increases in order from $x_1$, $x_2$, $x_3$ and $x_4$. Signal converting section 60 carries out unitary conversion of the received signals as in $z=(z_1 \ldots z_4)^T = Q^H y$ and inputs the converted signals to maximum likelihood detection section 70.

In the first stage in maximum likelihood detection section 70, processing corresponding to default setting is carried out in deciding section 72-4. In this stage, the equation related to above $z_4$ is focused upon. Matrix elements $r_{44}$ are known, and $z_4$ do not interfere with other signals and rely on only one transmission signal $x_4$. In this way, there are maximum sixteen patterns of signal point candidates of transmission signal $x_4$. Symbol replica generating section 74-4 generates sixteen signal point candidates (C=16) of $x_4$. In other words, sixteen signal points on the signal constellation are selected. The square Euclidean distances between these candidates and converted fourth received signal $z_4$ are calculated in square Euclidean distance calculating section 76-4, and $S_1$ candidates are selected as surviving candidates in order from the shortest distance.

The second stage is performed in deciding section 72-3. Here, the equation related to $z_3$ is focused upon. Matrix elements $r_{33}$ and $r_{34}$ are known, and there are sixteen patterns of signal candidates of $x_4$ and sixteen patterns of signal candidates of $x_3$. Sixteen signal points are introduced by symbol replica generating section 74-3 as additional signal points for $x_3$. Consequently, there may be 16×16=256 patterns of combinations of signal points (that is, 256 candidates). The 256 patterns of square Euclidean distances between these candidates and third received signal $x_3$ are calculated, and the candidates are narrowed down by selecting sixteen ($S_2=16$) combinations in order from the smallest value.

Similar processing is carried out by deciding section 72-2 for the third stage. In this stage, the equation related to $z_2$ is focused upon. Matrix elements $r_{22}, r_{23}$ and $r_{24}$ are known and combinations of transmission signals $x_3$ and $x_4$ are narrowed down to sixteen patterns of candidates in the previous stage, and there are sixteen patterns of signal point candidates of $x_2$. Consequently, symbol replica generating section 74-2 generates sixteen candidates of $x_2$. By selecting sixteen ($S_3=16$) candidates of shorter square Euclidean distances from 256 patterns of combinations of signal points in this case, the candidates are narrowed down.

Similar processing is carried out by deciding section 72-1 for the fourth stage (here, the final stage). In this stage, the equation related to $z_1$ is focused upon. Matrix elements $r_{11}$, $r_{12}, r_{13}$ and $r_{14}$ are known and combinations of transmission signals $x_2, x_3$ and $x_4$ are narrowed down to sixteen patterns of candidates in the previous stage, and so there are sixteen signal point candidates for $x_1$. Consequently, symbol replica generating section 74-1 generates sixteen candidates related to $x_1$. By selecting sixteen patterns of candidates ($S_4=16$) of shorter square Euclidean distances from 256 patterns of combinations of signal points in this case, the candidates are narrowed down.

By limiting the number of candidates to equal to or less than a certain number (for example, $S_1 \leq C$) in each stage in this way, signal point candidates of transmission signals can be narrowed down without calculating the square Euclidean distances for all possible combinations of signal points.

Patent Document 1: Japanese Patent Application Laid-Open No. 2006-157390

DISCLOSURE OF INVENTION

Problems to be Solved by the Invention

However, the amount of operation is great in the above conventional signal demultiplexing method, and further reduction in the amount of operation is desired. Even if symbol candidates are simply reduced, although the amount of operation is reduced, there is a possibility that there is no bit likelihood. In this case, precision of subsequent demodulation decreases and there is a possibility that communication quality deteriorates. Further, particularly if the number of transmitting antennas is little and the M-ary modulation value is great, the amount of operation in the final stage becomes a problem. For example, in case of 2×2 MIMO, 64 QAM and QRM-MLD, if the number of selected symbol candidates in stage 1 is N, the square Euclidean distance calculation count in stage 1 is 64 times and N×64 times in stage 2.

It is therefore an object of the present invention to provide a signal demultiplexing apparatus and signal demultiplexing method for reducing the amount of operation and improving communication quality by lowering the probability that there is no bit likelihood.

Means for Solving the Problem

The signal demultiplexing apparatus according to the present invention is a signal demultiplexing apparatus that is used in a wireless receiving apparatus of a multi-input and multi-output scheme and that carries out signal demultiplexing in two stages according to a maximum likelihood detection scheme, and employs a configuration including: a channel matrix rearranging section that generates a second channel estimation matrix by rearranging rows of a first channel estimation matrix; a decomposition section that performs QR decomposition using the first and second channel estimation matrices and calculates a unitary matrix and a triangular matrix of each of the first and second channel estimation matrices; a multiplying section that multiplies a conjugate transpose matrix of the unitary matrix and a received signal for each of the first and second channel estimation matrices; a transmission signal candidate detecting section that detects in a second stage a transmission signal candidate in the second stage that is closest to a signal point calculated using calculation results in the decomposition section and the multiplying section and a transmission signal candidate in a first stage; and a distance calculating section that calculates a distance between the signal point and the transmission signal candidate calculated in the transmission signal candidate detecting section.

Further, the signal demultiplexing apparatus according to the present invention is signal demultiplexing apparatus that is used in a wireless receiving apparatus of a multi-input and multi-output scheme and that carries out signal demultiplexing in three or more stages according to a maximum likelihood detection scheme, and employs a configuration including: a channel matrix rearranging section that generates a second channel estimation matrix by rearranging at least a first row of a first channel estimation matrix by a different random row; a decomposition section that performs QR decomposition using the first and second channel estimation matrices and calculates a unitary matrix and a triangular matrix of each of the first and second channel estimation matrices; a multiplying section that multiplies a conjugate transpose matrix of the unitary matrix and a received signal for each of the first and second channel estimation matrices; a transmission signal candidate detecting section that detects in a final stage a transmission signal candidate in the final stage that is closest to a signal point calculated using calculation results in the decomposition section and the multiplying section and combinations of transmission signal candidates up to a stage immediately before the final stage; and a distance calculating section that calculates a distance between the signal point and the transmission signal candidate calculated in the transmission signal candidate detecting section.

The signal demultiplexing method according to the present invention is a signal demultiplexing method that is used in a wireless receiving apparatus of a multi-input and multi-output scheme and that carries out signal demultiplexing of a maximum likelihood detection scheme in two stages, and includes: a channel matrix rearranging step of generating a second channel estimation matrix by rearranging rows of a first channel estimation matrix; a decomposition step of performing QR decomposition using the first and second channel estimation matrices, and calculating a unitary matrix and a triangular matrix of each of the first and second channel estimation matrices; a multiplying step of multiplying a conjugate transpose matrix of the unitary matrix and a received signal for each of the first and second channel estimation matrices; a transmission signal candidate detecting step of detecting in a second stage a transmission signal candidate in the second stage that is closest to a signal point calculated using calculation results in the decomposition step and the multiplying step and a transmission signal candidate in a first stage; and a distance calculating step of calculating a distance between the signal point and the transmission signal candidate calculated in the transmission signal candidate detecting step.

Further, the signal demultiplexing method according to the present invention is a signal demultiplexing method that is used in a wireless receiving apparatus of a multi-input and multi-output scheme and that carries out signal demultiplexing in three or more stages according to a maximum likelihood detection scheme, and includes: a channel matrix rearranging step of generating a second channel estimation matrix by rearranging at least a first row of a first channel estimation matrix by a different random row; a decomposition step of performing QR decomposition using the first and second channel estimation matrices, and calculating a unitary matrix and a triangular matrix of each of the first and second channel estimation matrices; a multiplying step of multiplying a conjugate transpose matrix of the unitary matrix and a received signal for each of the first and second channel estimation matrices; a transmission signal candidate detecting step of detecting in a final stage a transmission signal candidate in the final stage that is closest to a signal point calculated using calculation results in the decomposition step and the multiplying step and combinations of transmission signal candidates up to a stage immediately before the final stage; and a distance calculating step of calculating a distance between the signal point and the transmission signal candidate calculated in the transmission signal candidate detecting step.

Advantageous Effect of the Invention

The present invention makes it possible to reduce the amount of operation and improve communication quality.

BEST MODE FOR CARRYING OUT THE INVENTION

Embodiments of the present invention will be described below in detail with reference to the accompanying drawings.

Further, the signal demultiplexing apparatus of the present embodiment is used in a wireless receiver of the MIMO scheme.

Embodiment 1

Figure 1:
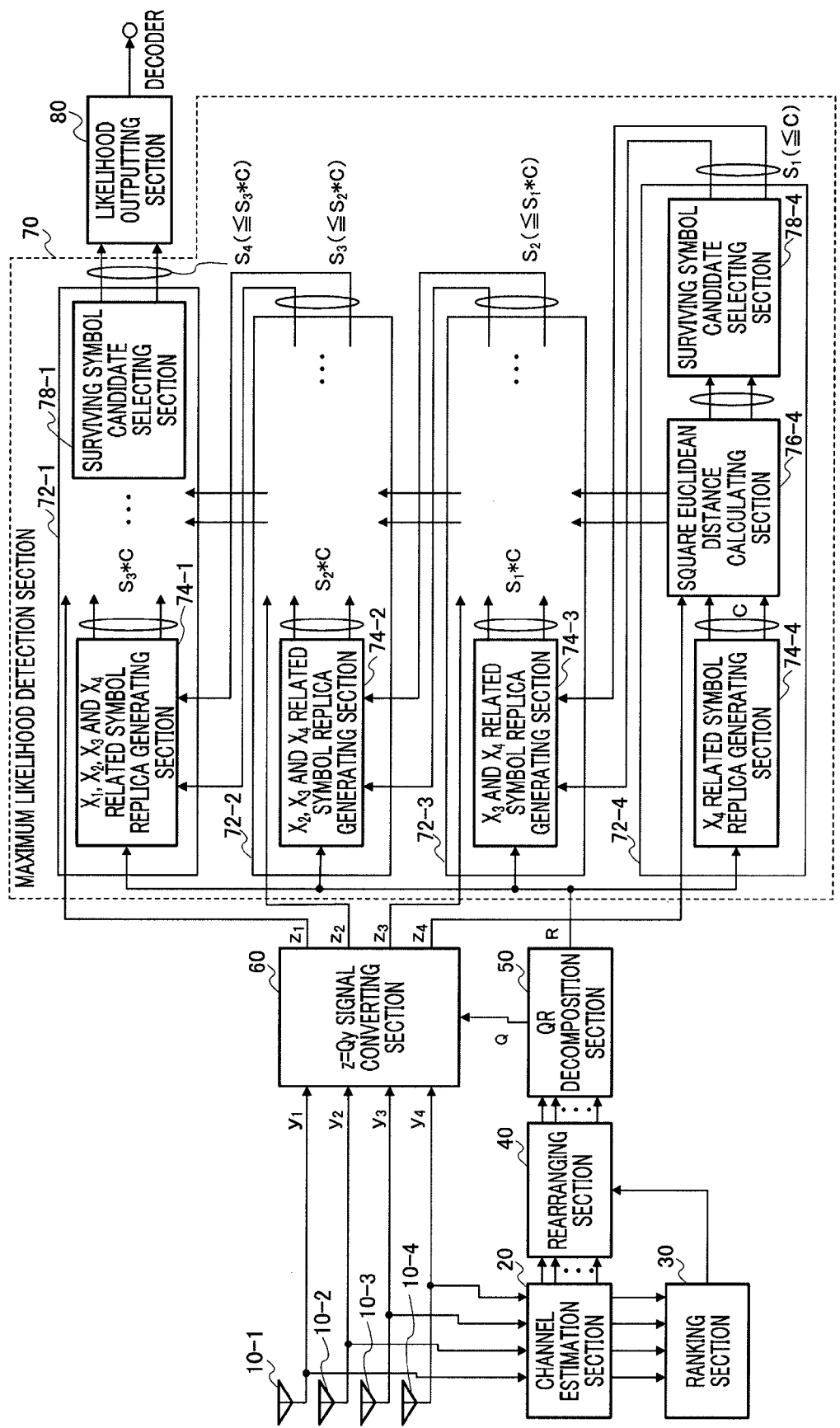
FIG. 1 is a block diagram showing a configuration of a receiver that carries out signal demultiplexing according to a conventional QRM-MLD method.
Figure 2:
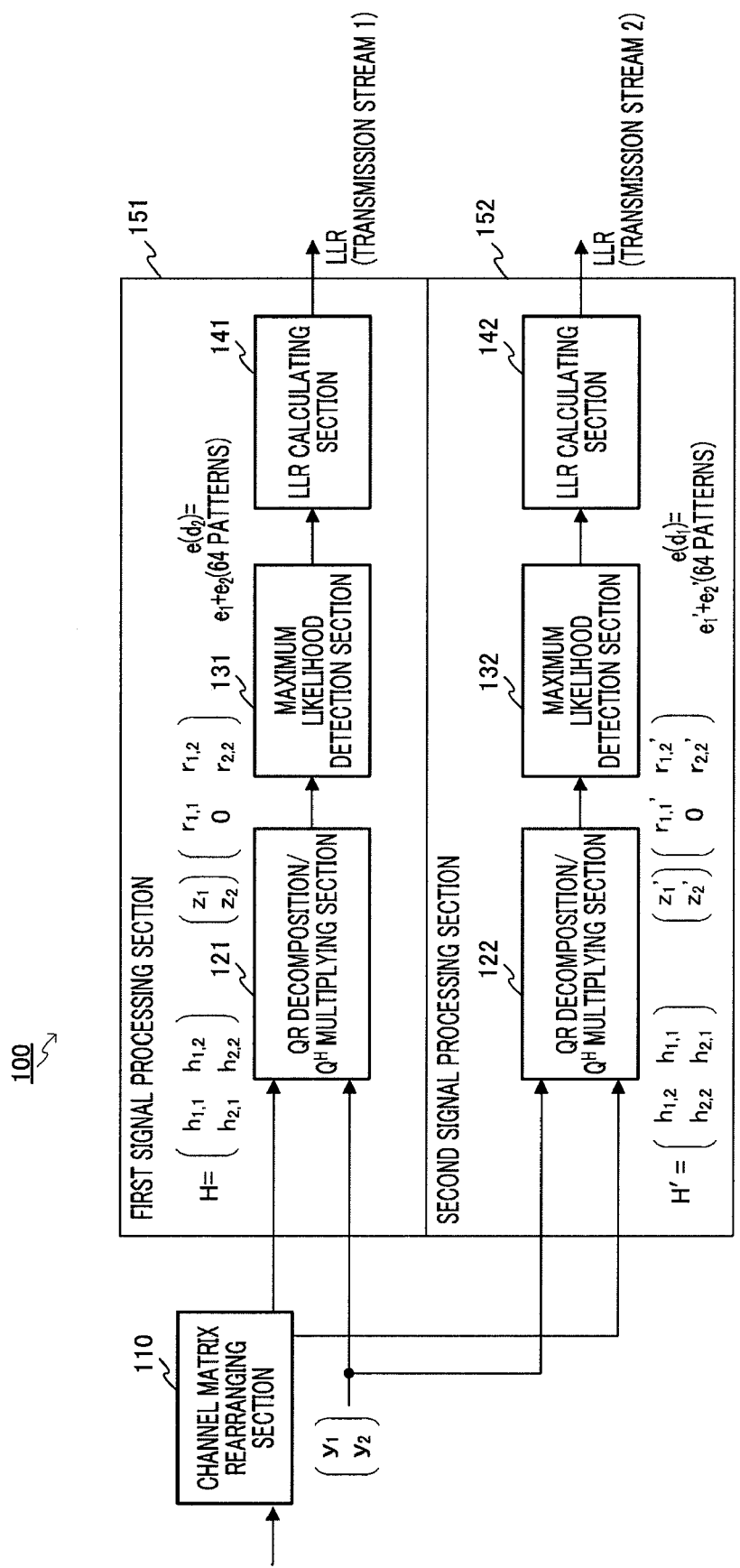
FIG. 2 is a block diagram showing a configuration of a signal demultiplexing apparatus according to Embodiment 1 of the present invention.

FIG. 2 is a block diagram showing a configuration of signal demultiplexing apparatus 100 according to Embodiment 1 of the present invention.

Signal demultiplexing apparatus 100 shown in FIG. 2 has channel matrix rearranging section 110, QR decomposition/$Q^H$ multiplying sections 121 and 122, maximum likelihood detection (MLD) sections 131 and 132 and LLR calculating sections 141 and 142. Further, in this signal demultiplexing apparatus 100, QR decomposition/$Q^H$ multiplying section 121, maximum likelihood detection section 131 and LLR calculating section 141 form first signal processing section 151, and QR decomposition/$Q^H$ multiplying section 122, maximum likelihood detection section 132 and LLR calculating section 142 form second signal processing section 152, which is a different sequence from first signal processing section 151. These first signal processing section 151 and second signal processing section 152 employ the same circuit configuration, and input and output signals alone are different. Further, although first signal processing section 151 and second signal processing section 152 carry out processing in parallel, one signal processing section may carry out each processing of first signal processing section 151 and second signal processing section 152 in time sequence.

Channel matrix rearranging section 110 generates a plurality of matrices generated by rearranging elements of a channel estimation matrix of received signals multiplied upon symbol candidates in the final stage.

In channel matrix rearranging section 110, as matrices generated by rearranging elements of the channel estimation matrix, a plurality of matrices are generated such that the first (leftmost) row vector in the channel matrix varies. For example, to receive four received signals, two or more matrices in which row vectors associated with respective transmission streams among four transmission streams are placed in the first row vectors in the channel estimation matrices, are generated. In this case, as for the row vectors other than the first row vector, row vectors associated with the rest of transmission streams may be arranged in any way.

Here, channel matrix H is outputted to first signal processing section 151, and channel matrix H' represented by following equation (1) and generated by rearranging row vectors of transmission stream components of channel matrix H represented by following equation (1), is outputted to second signal processing section 152.

(Equation 1)

$$H = \begin{pmatrix} h_{1,1} & h_{1,2} \\ h_{2,1} & h_{2,2} \end{pmatrix}, H' = \begin{pmatrix} h_{1,2} & h_{1,1} \\ h_{2,2} & h_{2,1} \end{pmatrix} \quad [1]$$

QR decomposition/$Q^H$ multiplying section 121 of first signal processing section 151 receives as input channel matrix H from channel matrix rearranging section 110 and received signal Y ($y_1$, $y_2$). QR decomposition/$Q^H$ multiplying section 121 performs QR decomposition with respect to channel matrix H received as input to decompose channel estimation value H, which is received as input, to unitary matrix Q and upper triangle matrix R, and generates received signal $Z=Q^H Y$ after orthogonalization using received signal Y and generated matrix Q. By this means, QR decomposition/$Q^H$ multiplying section 121 outputs received signal Z and matrix R to maximum likelihood detection section 131.

QR decomposition/$Q^H$ multiplying section 122 of second signal processing section 152 receives as input channel matrix H' generated by rearranging transmission stream components of channel matrix H inputted in QR decomposition/$Q^H$ multiplying section 122 of first signal processing section 151, and received signal Y ($y_1$, $y_2$).

This QR decomposition/$Q^H$ multiplying section 122 performs QR decomposition with respect to channel matrix H' received as input as in QR decomposition/$Q^H$ multiplying section 121 to decompose channel estimation value H' received as input to unitary matrix Q' and upper triangular matrix R', and generates received signal $Z'=Q'^H Y$ after orthogonalization using received signal Y and generated matrix Q'. In this way, QR decomposition/$Q^H$ multiplying section 122 outputs received signal Z' and matrix R' to maximum likelihood detection section 132.

Using received signal Z and matrix R received as input from QR decomposition/$Q^H$ multiplying section 121, maximum likelihood detection section 131 calculates volumes showing square Euclidean distances in a number of stages corresponding to the number of transmission streams to be received, that is, in two stages here.

Maximum likelihood detection section 131 calculates, in the final stage (i.e. stage 2 here) in particular, only volumes showing square Euclidean distances between signal points of when combinations of symbol candidates up to the stage immediately before the final stage (i.e. stage 1 here) are fixed and candidate points in the final stage closest to the signal points, and outputs the volumes to LLR calculating section 141.

Using received signal Z' and matrix R' received as input from QR decomposition/$Q^H$ multiplying section 122, maximum likelihood detection section 132 calculates volumes showing square Euclidean distances in a number of stages corresponding to the number of transmission streams to be received, that is, in two stages here.

Maximum likelihood detection section 132 calculates, in the final stage (i.e. stage 2 here) in particular, only volumes showing square Euclidean distances between signal points of when combinations of symbol candidates up to the stage immediately before the final stage (i.e. stage 1 here) are fixed and candidate points in the final stage closest to the signal points, and outputs the volumes to LLR calculating section 142.

Further, these maximum likelihood detection sections 131 and 132 will be described in detail below.

Using square Euclidean distances $e_1$ in stage 1 and square Euclidean distances $e_2$ in stage 2 received as input from maximum likelihood detection section 131, LLR calculating section 141 calculates the likelihood of each bit of symbol candidates $d_2$ in stage 1, that is, calculates log likelihood values including the log likelihood values of all bits of symbol candidates $d_2$ in stage 1.

Using square Euclidean distances $e_1'$ in stage 1 and square Euclidean distances $e_2'$ in stage 2 received as input from maximum likelihood detection section 132, LLR calculating section 142 calculates the likelihood of each bit of symbol candidates $d_1$ in stage 2, that is, calculates log likelihood values including the log likelihood values of all bits of symbol candidates $d_1$.

Maximum likelihood detection sections 131 and 132 in signal processing sections 151 and 152 will be described here in detail.

Figure 3:
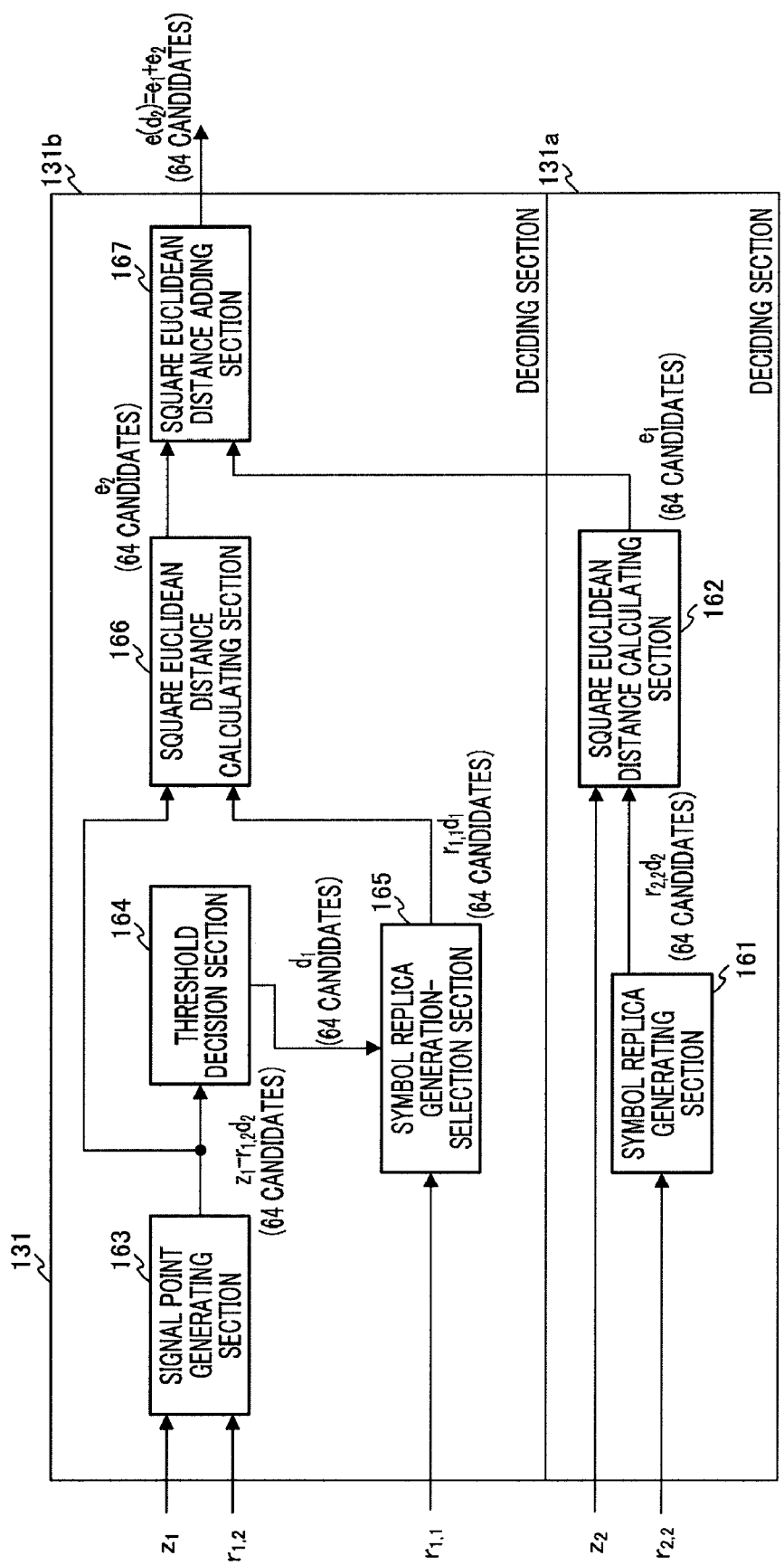
FIG. 3 is a block diagram showing a configuration of a maximum likelihood detection section of a first signal processing section shown in FIG. 2.

FIG. 3 is a block diagram showing a configuration of maximum likelihood detection section 131 shown in FIG. 2.

Maximum likelihood detection section 131 has components used in, roughly speaking, stage 1 and stage 2, and components used in stage 1 include symbol replica generating section 161 and square Euclidean distance calculating section 162.

Symbol replica generating section 161 receives as input matrix R elements $r_{2,2}$. Using these signals received as input, this symbol replica generating section 161 generates symbol replicas $r_{2,2}d_2$ for all $d_2$ (64 candidates in case of 64 QAM) and outputs the symbol replicas to square Euclidean distance calculating section 162.

Square Euclidean distance calculating section 162 receives as input received signal $z_2$ and symbol replicas $r_{2,2}d_2$ from symbol replica generating section 161. Further, $z_2$ is a "signal point" in stage 1, $d_2$ is a symbol candidate in stage 1 and $r_{2,2}d_2$ is a candidate point in stage 1.

Using these signals received as input, square Euclidean distance calculating section 162 calculates square Euclidean distances $e_1 (e_1 = |z_2 - r_{2,2}d_2|^2)$ between received signal $z_2$ and symbol replicas $r_{2,2}d_2$ for all $d_2$ (64 candidates in case of 64 QAM). Calculated square Euclidean distances $e_1$ are outputted to square Euclidean distance adding section 167. Further, the square Euclidean distance calculation count in this stage 1 is sixty four.

Components used in stage 2 include signal point generating section 163, threshold decision section 164, symbol replica generation-selection section 165, square Euclidean distance calculating section 166 and square Euclidean distance adding section 167.

Signal point generating section 163 receives as input received signal $z_1$ and matrix R elements $r_{1,2}$. Using these signals received as input, signal point generating section 163 generates signal points $z_1 - r_{1,2}d_2$ for all $d_2$ (sixty four candidates in case of 64 QAM), and outputs the signal points to threshold decision section 164. Further, $z_1 - r_{1,2}d_2$ are "signal points of when symbol candidates are fixed" in stage 2.

In deciding section 131b in the final stage, threshold decision section 164 detects candidate points in the final stage closest to the signal points of when combinations of symbol candidates up to the stage immediately before the final stage are fixed.

Here, threshold decision section 164 performs threshold decision in the I and Q axes with respect to all signal points $z_1 - r_{1,2}d_2$ (sixty four points) received as input from signal point generating section 163, detects symbol candidates (i.e. candidate points) $d_1$ which are the nearest neighboring signal points on the constellation and outputs the symbol candidates to symbol replica generation-selection section 165.

Threshold decision in threshold decision section 164 will be described here specifically.

Figure 4:
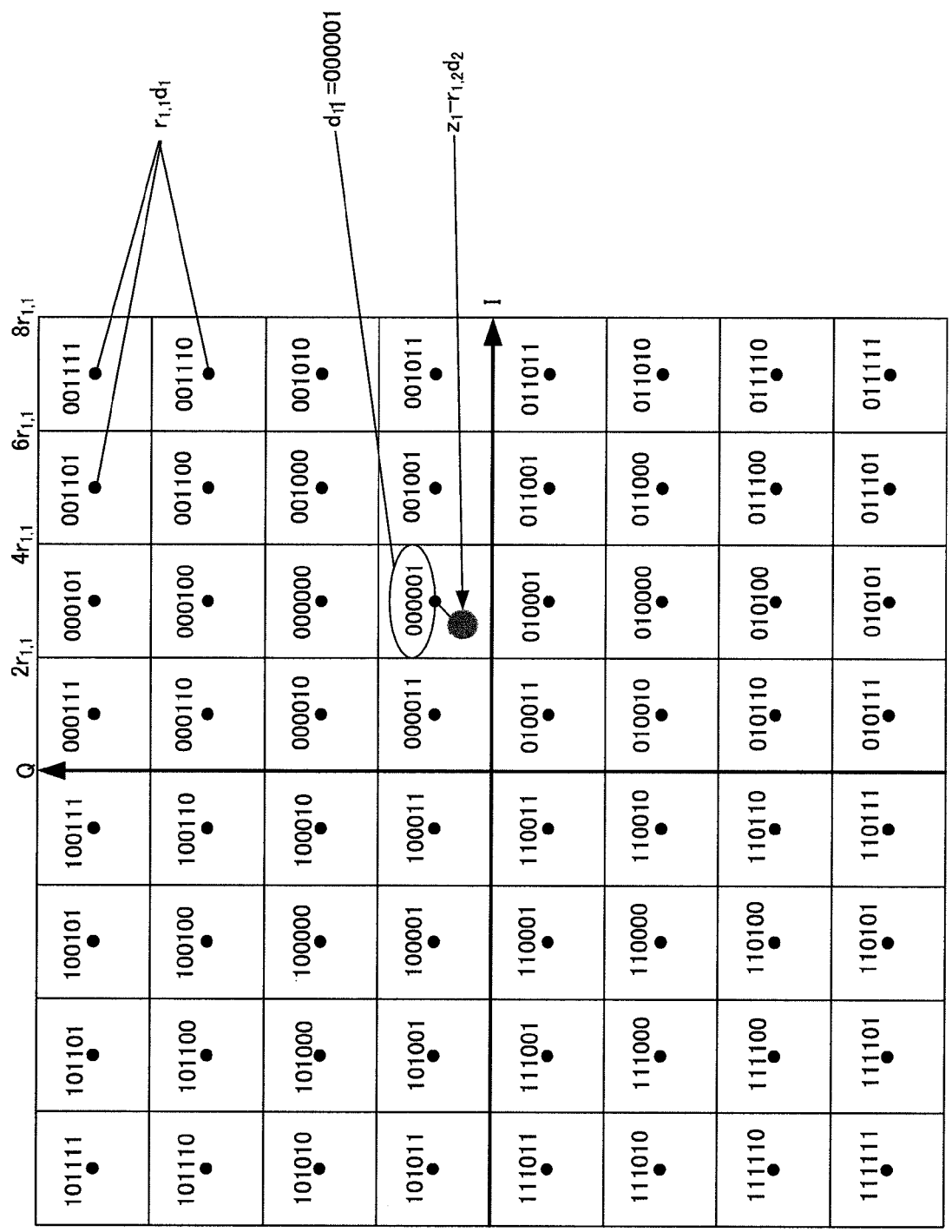
FIG. 4 illustrates an operation of a threshold decision section.

FIG. 4 illustrates the operation of threshold decision section 164.

When threshold decision is performed with respect to signal point $z_1 - r_{1,2}d_2$ shown by the symbol "●" in FIG. 4, in which partition on the constellation this signal point is included is determined.

In FIG. 4, by performing decision, for example, decision of the sign of a symbol, volume decision with respect to $\pm 4r_{1,1}$ and volume decision with respect to $\pm 2, 6r_{1,1}$, a symbol candidate ($d_1$=000001) as the candidate point in the final stage closest to the signal point is determined.

According to this determination, threshold decision section 164 determines $d_1$ associated with each signal point $z_1 - r_{1,2}d_2$ (sixty four points), and outputs $d_1$ to symbol replica generation-selection section 165.

Further, when symbol candidate $d_2$ in stage 1 is fixed to a random value, the relationship of square Euclidean distance $e_2 = |z_1 - r_{1,2}d_2 - r_{1,1}d_1|^2$ holds, so that symbol candidate $d_1$ in this stage 2 adopts shortest square Euclidean distance $e_2$.

Symbol replica generation-selection section 165 receives as input matrix R elements $r_{1,1}$ and symbol candidates $d_1$ (sixty four candidates here) from threshold decision section 164. Using the signals received as input, symbol replica generation-selection section 165 generates symbol replicas $r_{1,1}d_1$ associated with all symbol candidates $d_1$ (sixty four candidates for 64 QAM), and selects $r_{1,1}d_1$ (sixty four candidate points) according to symbol candidates $d_1$ (candidates of the shortest square Euclidean distances of when symbol candidates $d_2$ are fixed) received as input from threshold decision section 164.

Further, symbol candidates $d_1$ are symbol candidates in stage 2 and $r_{1,1}d_1$ are candidate points in stage 2. There are sixty four different symbol candidates $d_2$ in case of 64 QAM, and, therefore, there are symbol candidates $d_1$ associated with these symbol candidates $d_2$. However, there are cases where different symbol candidates $d_2$ are associated with same symbol candidate $d_1$.

Square Euclidean distance calculating section 166 calculates only volumes showing square Euclidean distances between candidate points $d_1$ in the final stage closest to signal points $(z_1 - r_{1,2}d_2)$ of when combinations of symbol candidates $d_2$ up to the stage immediately before the final stage (i.e. deciding section 131a in stage 1 here) are fixed and the signal points $(z_1 - r_{1,2}d_2)$ of when the candidates are fixed.

That is, square Euclidean distance calculating section 166 calculates square Euclidean distances $e_2$ between signal points $z_1 - r_{1,2}d_2$ (sixty four points) and symbol replicas $r_{1,1}d_1$ (sixty four points) associated with these signal points.

Square Euclidean distance calculating section 166 calculates only $e_2$ of the shortest square Euclidean distance according to each symbol candidate $d_2$. Consequently, with the present embodiment, the square Euclidean distance calculation count in stage 2 is sixty four.

This square Euclidean distance calculating section 166 outputs calculated square Euclidean distances $e_2$ to square Euclidean distance adding section 167.

Square Euclidean distance adding section 167 adds square Euclidean distances $e_1$ in stage 1 associated with symbol candidates $d_2$ and square Euclidean distances $e_2$ in stage 2 associated with combinations of $d_2$ and $d_1$, and calculates final square Euclidean distance $e(=e_1+e_2)$. Calculated final square Euclidean distance $e(=e_1+e_2)$ is outputted to LLR calculating section 141 (see FIG. 2).

Next, maximum likelihood detection section 132 in second signal processing section 152 will be described. Further, this second signal processing section 152 differs from first signal processing section 151 in that values received as input are changed to Z' and R' from Z and R, and the other basic configuration and operation are the same as first signal processing section 151.

Figure 5:
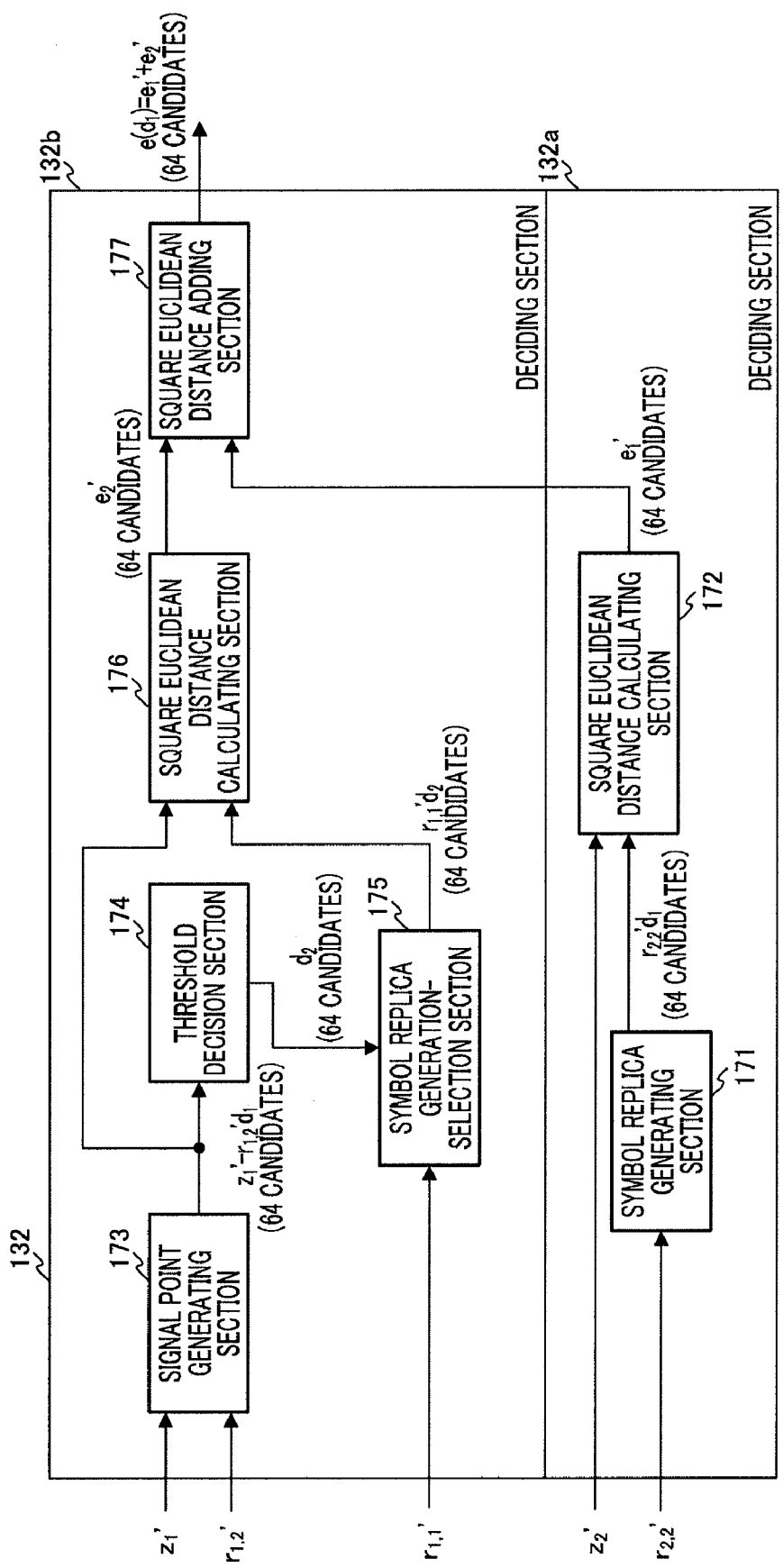
FIG. 5 is a block diagram showing a configuration of the maximum likelihood detection section of a second signal processing section shown in FIG. 2.

FIG. 5 is a block diagram showing a configuration of maximum likelihood detection section 132 shown in FIG. 2.

Maximum likelihood detection section 132 has components used in, roughly speaking, stage 1 and stage 2, and components used in stage 1 include symbol replica generating section 171 and square Euclidean distance calculating section 172.

Symbol replica generating section 171 receives as input matrix R' elements $r_{2,2}'$ which are different from a signal generated by rearranging transmission stream components of a channel matrix received as input, that is, a signal inputted in symbol replica generating section 161 of first signal processing section 151. Using the signals received as input, this symbol replica generating section 171 generates symbol replicas $r_{2,2}'d_1$ for all $d_1$ (64 candidates in case of 64 QAM) and outputs the symbol replicas to square Euclidean distance calculating section 172.

Square Euclidean distance calculating section 172 receives as input received signal $z_2'$ and symbol replicas $r_{2,2}'d_1$ from symbol replica generating section 171. Using these signals received as input, square Euclidean distance calculating section 172 calculates square Euclidean distances $e_1'$ ($e_1' = |z_2' - r_{2,2}'d_1|^2$) between received signal $z_2'$ and symbol replicas $r_{2,2}'d_1$ for all $d_1$ (64 candidates in case of 64 QAM). Calculated square Euclidean distances $e_1$ are outputted to square Euclidean distance adding section 177. The square Euclidean distance calculation count in this stage 1 is sixty four.

Similar to first signal processing section 151, components used in stage 2 include signal point generating section 173, threshold decision section 174, symbol replica generation-selection section 175, square Euclidean distance calculating section 176 and square Euclidean distance adding section 177.

Signal point generating section 173 receives as input received signal $z_1'$ and matrix R elements $r_{1,2}'$. Using these signals received as input, signal point generating section 173 generates signal points $z_1' - r_{1,2}'d_1$ for all $d_2$ (sixty four candidates in case of 64 QAM), and outputs the signal points to threshold decision section 174.

In deciding section 132b in the final stage, threshold decision section 174 detects candidate points in the final stage closest to the signal points of when combinations of symbol candidates up to the stage immediately before the final stage are fixed.

Here, threshold decision section 174 performs threshold decision in the I and Q axes with respect to all signal points $z_1' - r_{1,2}'d_1$ (sixty four points) received as input from signal point generating section 173, detects symbol candidates (i.e. candidate points) $d_2$ which are the nearest neighboring signal points on the constellation and outputs the symbol candidates to symbol replica generation-selection section 175.

Threshold decision in threshold decision section 174 with respect to all signal points $z_1' - r_{1,2}'d_1$ received as input is performed in the same way as threshold decision in threshold decision section 164. That is, with reference to FIG. 5, by performing decision, for example, decision of the sign of symbols with respect to signal points $z_1' - r_{1,2}'d_1$, volume decision with respect to $\pm 4r_{1,1}$ and volume decision with respect to $\pm 2,6r_{1,1}$ on the constellation of FIG. 4, in which partition on the constellation these signal points are included is determined as in first signal processing section 151.

According to this determination, threshold decision section 174 determines $d_2$ which is associated with each signal point $z_1' - r_{1,2}'d_1$ (sixty four points), that is, symbol candidate $d_2$ which is a candidate point in the final stage closest to the signal point, and outputs symbol candidate $d_2$ to symbol replica generation-selection section 165.

Further, when symbol candidate $d_1$ in stage 1 is fixed to a random value, the relationship of square Euclidean distance $e_2' = |z_1' - r_{1,2}'d_1 - r_{1,1}'d_2|^2$ holds, so that symbol candidate $d_2$ in this stage 2 adopts shortest square Euclidean distance $e_2'$.

Symbol replica generation-selection section 175 receives as input matrix R elements $r_{1,1}'$ and symbol candidates $d_2$ (sixty four candidates here) from threshold decision section 174. Using the signals received as input, symbol replica generation-selection section 175 generates symbol replicas $r_{1,1}'d_2$ for all symbol candidates $d_2$ (sixty four candidates for 64 QAM) and selects $r_{1,1}'d_2$ (sixty four points) according to $d_2$ (candidates of the shortest square Euclidean distances when symbol candidates $d_1$ are fixed) received as input from threshold decision section 174.

Further, there are sixty four different symbol candidates $d_1$ in case of 64 QAM, and, therefore, there are sixty four symbol candidates $d_2$ associated with these symbol candidates $d_1$. However, there are cases where different symbol candidates $d_1$ are associated with same candidate $d_2$.

Square Euclidean distance calculating section 176 calculates only volumes showing square Euclidean distances between candidate points $d_2$ in the final stage closest to signal points $(z_1'-r_{1,2}'d_2)$ of when combinations of symbol candidates $d_2$ up to the stage immediately before the final stage (i.e. deciding section 132a in stage 1 here) are fixed and the signal points $(z_1'-r_{1,2}'d_2)$ of when the candidates are fixed.

That is, square Euclidean distance calculating section 176 calculates square Euclidean distances $e_2'$ between signal points $z_1'-r_{1,2}'d_1$ (sixty four points) and symbol replicas $r_{1,1}'d_2$ (sixty four points) associated with these signal points.

Square Euclidean distance calculating section 176 calculates only $e_2'$ of the shortest square Euclidean distance according to each symbol candidate $d_1$. Consequently, with the present embodiment, the square Euclidean distance calculation count in stage 2 is sixty four.

Square Euclidean distance calculating section 176 outputs calculated square Euclidean distances $e_2'$ to square Euclidean distance adding section 177.

Square Euclidean distance adding section 177 adds square Euclidean distances $e_1'$ in stage 1 associated with symbol candidates $d_1$ and square Euclidean distances $e_2'$ in stage 2 associated with combinations of $d_2$ and $d_1$, and calculates final square Euclidean distance $e'(=e_1'+e_2')$. Calculated final square Euclidean distance $e(=e_1+e_2)$ is outputted to LLR calculating section 142 (see FIG. 2).

Next, the operation will be described. QR decomposition/ $Q^H$ multiplying section 121 of first signal processing section 151 receives as input channel matrix H and generates matrix Q and matrix R by performing QR decomposition, and generates received signal $Z=Q^H Y$ by using received signal Y and generated matrix Q. In this way, QR decomposition/$Q^H$ multiplying section 121 of first signal processing section 151 outputs received signal Z and matrix R to maximum likelihood detection section 131.

QR decomposition/$Q^H$ multiplying section 122 of second signal processing section 152 receives as input channel matrix H' (equation 5) generated by rearranging transmission stream components of channel matrix H inputted in QR decomposition/$Q^H$ multiplying section 121 of first signal processing section 151, and generates matrix Q' and matrix R' by performing QR decomposition as in first signal processing section 151. Further, by using received signal Y and generated matrix Q' in the same way, QR decomposition/$Q^H$ multiplying section 122 generates received signal $Z'=Q'^H Y$ and outputs received signal Z' and matrix R' to maximum likelihood detection section 132.

Next, the operation of maximum likelihood detection section 131 in first signal processing section 131 will be described.

Symbol replica generating section 161 in stage 1, that is, in deciding section 131a immediately before the final stage, receives as input matrix R elements $r_{2,2}$ and generates symbol replicas $r_{2,2}d_2$ for all $d_2$ (64 candidates for 64 QAM). Square Euclidean distance calculating section 162 calculates square Euclidean distances $(e_1=|z_2-r_{2,2}d_2|^2)$ between received signal $z_2$ and symbol replicas $r_{2,2}d_2$ for all $d_2$ (sixty four candidates for 64 QAM). Consequently, the square Euclidean distance calculation count in deciding section 131a immediately before the final stage is sixty four.

Signal point generating section 163 in stage 2, that is, in deciding section 131b in the final stage, receives as input received signal $z_1$ and matrix R elements $r_{1,2}$ and generates signal points $z_1-r_{1,2}d_2$ for all $d_2$ (64 candidates for 64 QAM). Threshold decision section 164 performs threshold decision in the I and Q axes with respect to all signal points $z_1-r_{1,2}d_2$ (sixty four points) (1: Is the sign of the signal point positive or negative?; 2: Is the symbol greater or smaller than $\pm 4r_{1,1}$?; and 3: Is the symbol greater or smaller than $\pm 2, 6r_{1,1}$?), determines in which partition the signal points are included on the constellation (see FIG. 4) and determines $d_1$ associated with signal points $z_1-r_{1,2}d_2$ (sixty four points).

When $d_2$ is fixed to a random value, the relational equation of square Euclidean distance $e_2=|z_1-r_{1,2}d_2-r_{1,1}d_1|^2$ holds, so that this $d_1$ adopts shortest square Euclidean distance $e_2$.

Symbol replica generation-selection section 165 receives as input matrix R elements $r_{1,1}$, generates symbol replicas $r_{1,1}d_1$ for all $d_1$ (sixty four candidates for 64 QAM) and selects $r_{1,1}d_1$ (sixty four points) according to $d_1$ from threshold decision section 164 of the shortest square Euclidean distances of when $d_2$ are fixed.

Square Euclidean calculating section 166 calculates square Euclidean distances $e_2$ between signal points $z_1-r_{1,2}d_2$ (sixty four points) and symbol replicas $r_{1,1}d_1$ (sixty four points) associated with these signal points. At this point, as shown in upper right of FIG. 6, only $e_2$ of the shortest Euclidean distance is calculated according to each $d_2$. Consequently, the square Euclidean distance calculation count in stage 2 is sixty four.

Finally, square Euclidean distance adding section 167 adds square Euclidean distances in stage 1 associated with $d_2$ and square Euclidean distances in stage 2 associated with combinations of $d_2$ and $d_1$ and calculates final square Euclidean distance $e(=e_1+e_2)$. By means of the above processings, all square Euclidean distances required for calculating the log likelihood ratio of each bit of $d_2$ are prepared. Further, in log likelihood ratio (LLR) calculation, only the shortest square Euclidean distances in case where each bit becomes zero or one are used. Consequently, when the log likelihood values of $d_2$ are calculated, if bit values of $d_2$ are common, only the square Euclidean distances adopting the shortest distances are selected.

Next, the operation of maximum likelihood detection section 132 in second signal processing section 152 will be described.

The basic operation of this second signal processing section 152 is the same as in first signal processing section 151, and only values received as input are changed from Z and R to Z' and R'.

Symbol replica generating section 171 in stage 1, that is, in deciding section 132a immediately before the final stage, receives as input matrix R' elements $r_{2,2}'$ and generates symbol replicas for all (64 candidates for 64 QAM) $d_1$ ($d_1$ in stage 1 of second signal processing section 152 because transmission stream components in the channel matrix have been rearranged). Square Euclidean distance calculating section 172 calculates square Euclidean distances $(e_1'=|z_2'-r_{2,2}'d_1|^2)$ between received signal $z_2'$ and symbol replicas $r_{2,2}'d_1$ for all $d_1$ (sixty four candidates for 64 QAM).

Consequently, the square Euclidean distance calculation count in deciding section 132b immediately before the final stage is sixty four.

Similarly in stage 2, signal point generating section 173 receives as input received signal $z_1'$ and matrix R elements $r_{1,2}'$ and generates signal points $z_1'-r_{1,2}'d_1$ for all $d_1$ (sixty four candidates for 64 QAM). Threshold decision section 174 performs threshold decision in the I and Q axes with respect to all signal points $z_1'-r_{1,2}'d_1$ (sixty four points), determines in which partition the signal points are included on the constellation as in first signal processing section 151, and determines $d_2$ associated with signal points $z_1'-r_{1,2}'d_1$ (sixty four points).

When $d_1$ is fixed to a random value, the relational equation of square Euclidean distance $e_2'=|z_1'-r_{1,2}'d_1-r_{1,1}'d_2|^2$ holds, so that this $d_2$ adopts shortest square Euclidean distance $e_2'$.

Symbol replica generation-selection section 175 receives as input matrix R elements $r_{1,1}'$, generates symbol replicas $r_{1,1}' d_2$ for all $d_2$ (sixty four candidates for 64 QAM) and selects $r_{1,1}'d_2$ (sixty four points) according to $d_2$, received as input from threshold decision section 174, of the shortest square Euclidean distances of when $d_2$ are fixed.

Square Euclidean distance calculating section 176 calculates square Euclidean distances $e_2'$ between signal points $z_1'-r_{1,2}'d_1$ (sixty four points) and symbol replicas $r_{1,1}'d_2$ (sixty four points) associated with these signal points. At this point, as shown in lower right of FIG. 6, only $e_2$ of the shortest Euclidean distance is calculated according to each $d_1$. Consequently, the square Euclidean distance calculation count in stage 2 is sixty four.

Finally, square Euclidean distance adding section 177 adds square Euclidean distances in stage 1 associated with $d_1$ and square Euclidean distances in stage 2 associated with combinations of $d_1$ and $d_2$ and calculates final square Euclidean distance $e'(=e_1'+e_2')$. By means of the above processings, all square Euclidean distances required for calculating the log likelihood ratio of each bit of $d_1$ are prepared. In log likelihood ratio (LLR) calculation, only the shortest square Euclidean distances in case where each bit becomes zero or one are used. Consequently, when the log likelihood values of $d_1$ are calculated, if bit values of $d_1$ are common, only the square Euclidean distances adopting the shortest distances are selected.

Next, the operations of LLR calculating sections 141 and 142 using the square Euclidean distances outputted from maximum likelihood detection sections 131 and 132 will be described.

LLR calculating section 141 of first signal processing section 151 selects the shortest square Euclidean distances in case where each bit of $d_2$ is zero or one, from square Euclidean distances $e(d_2)$ received as input, and calculates the log likelihood ratios (LLR) of each bit of $d_2$ based on differences between the shortest square Euclidean distances.

For example, when the highest-order bit of $d_2$ is the target, LLR calculating section 141 selects the shortest square Euclidean distance from square Euclidean distances $e$ of $d_2$=000000~011111 of the highest-order bits zero and selects the shortest Euclidean distance from square Euclidean distances $e$ of $d_2$=100000~111111 of the highest-order bits one.

Similarly, LLR calculating section 142 of second signal processing section 152 selects the shortest square Euclidean distances in case where each bit of $d_1$ is zero or one, from square Euclidean distances $e(d_1)$ received as input, and calculates the log likelihood ratio (LLR) of each bit of $d_1$ based on differences between the shortest square Euclidean distances.

For example, when the highest-order bit of $d_1$ is the target, LLR calculating section 142 selects the shortest square Euclidean distance from square Euclidean distances $e'$ of $d_1$=000000~011111 of the highest-order bits zero and selects the shortest Euclidean distance from square Euclidean distances $e'$ of $d_1$=100000~111111 of the highest-order bits one.

In this way, with the present embodiment, QR decomposition is performed in each of a plurality of channel matrices rearranged in units of transmission streams such that two or more matrices R having different symbols in the final stage are provided. Next, in each first stage, square Euclidean distances are calculated for all symbol candidates. In each final stage, only volumes showing the square Euclidean distances between the signal points of when combinations of symbol candidates up to the stage immediately before the final stage are fixed and candidate points in the final stage closest to the signal points are calculated, that is, only the square Euclidean distances of the combinations of symbol candidate points of the smallest sums of square Euclidean distances are calculated for each symbol candidate in each first stage. Next, using the calculated square Euclidean distances, log likelihood ratios of only symbol candidate points in the first stage are calculated and log likelihood ratios of all bits are calculated.

Further, when the combinations of symbol candidate points of the smallest sums of square Euclidean distances in the final stage are calculated, the nearest symbol candidate points are determined by performing threshold decision in the I and Q axes with respect to symbol candidate points.

According to this configuration, from each signal processing sequence (i.e. signal processing sections 151 and 152), a likelihood of each bit value of symbol candidate $d_1$ in stage 1 and symbol candidate $d_1$ in stage 2 is outputted and log likelihood ratios of all bits are outputted in full, so that, in 2×2 MIMO signal demultiplexing, likelihoods as in QR-MLD are calculated and the square Euclidean distance ($e_1$ and $e_2$) calculation count can be reduced to $(2^m) \times 4$ from $\{(2^m)+(2^m)^2\}$ in conventional QR-MLD.

The square Euclidean distance calculation count by this signal demultiplexing apparatus 100 will be described in comparison with a conventional example. Further, although a case will be described here where 2×2 MIMO communication and 64 QAM are applied for ease of description, the present invention is not limited to this.

Here, conventional MLD involving QR decomposition will be described again.

According to QR-MLD, channel matrix H is QR decomposed to unitary matrix Q and upper triangular matrix R. Received signal vector Z after orthogonalization is calculated by multiplying received signal vector Y with $Q^H$. However, X is a transmission signal vector and N is a noise component vector. The equation representing this relationship is following equation 2.

(Equation 2)

$$Z = Q^H Y \qquad [2]$$
$$= Q^H(HX + N)$$
$$= RX + N'$$

$$\begin{bmatrix} z_1 \\ z_2 \end{bmatrix} = \begin{bmatrix} r_{11} & r_{12} \\ 0 & r_{22} \end{bmatrix} \begin{bmatrix} d_1 \\ d_2 \end{bmatrix} + \begin{bmatrix} n_1' \\ n_2' \end{bmatrix}$$

In QR-MLD, square Euclidean distances $e_1$ between $z_2$ and $r_{2,2}d_2$ are determined in stage 1 (Equation 3). Square Euclidean distances $e_2$ between $z_1$ and $r_{1,1}d_1+r_{1,2}d_2$ are determined in stage 2 (Equation 4). Then, the sum $e_{SUM}$ of square Euclidean distances in stage 1 and stage 2 is determined (equation 5).

(Equation 3)

$$e_1 = |z_2 - r_{22}d_2|^2 \qquad [3]$$

(Equation 4)

$$e_2 = |z_1 - r_{12}d_2 - r_{11}d_1|^2 \qquad [4]$$

(Equation 5)

$$e_{SUM} = e_1 + e_2 \qquad [5]$$

By contrast with this, in signal demultiplexing apparatus 100 according to the present embodiment, first, channel matrix rearranging section 110 generates a plurality of matrices by rearranging elements of a channel estimation matrix of received signals to be multiplied upon symbol candidates in the final stage.

To be more specific, using channel matrix H represented by above equation 1, channel matrix rearranging section 110 generates a plurality of matrices such that the first (leftmost) row vectors in channel estimation matrices are different. Here, channel matrix rearranging section 110 generates matrix H represented by above equation 1 and matrix H' represented by above equation 1 as a matrix generated by rearranging the elements of channel estimation matrix H, and outputs matrix H to first signal processing section 151 and matrix H' to second signal processing section 152.

First signal processing section 151 performs QR decomposition of channel matrix H (see following equation 6) and calculates all square Euclidean distances in stage between signal points ($z_2$) in stage 1 after QR decomposition and candidate points ($r_{2,2}d_2$). Next, first signal processing section 151 determines candidate points ($r_{1,1}d_1$) in stage 2 closest to signal points ($z_1-r_{1,2}d_2$) in stage 2 associated with symbol candidates ($d_2$) in stage 1, calculates square Euclidean distances in stage 2 and calculates final Euclidean distance (following equation 8), and calculates the log likelihood ratio of each bit of only $d_2$ from these square Euclidean-distances.

Further, second signal processing section 152 performs the same processing as in first signal processing section 151 with respect to channel matrix H' (see above equation 1) generated by rearranging the transmission stream components of channel matrix H. That is, second signal processing section 152 calculates all square Euclidean distances (following equation 7) in stage 1 between signal points ($z_2'$) in stage 1 after QR decomposition and candidate points ($r_{2,2}'d_2$). Next, second signal processing section 152 determines candidate points ($r_{1,1}'d_1$) in stage 2 closest to signal points ($z_1'-r_{1,2}'d_2$) in stage 2 associated with symbol candidates ($d_2$) in stage 1, calculates square Euclidean distances in stage 2 and calculates final square Euclidean distance (following equation 8), and calculates the log likelihood ratio of each bit of only $d_1$ (symbol candidates continuing from stage 1 are $d_1$).

(Equation 6)

$$\begin{bmatrix} z_1 \\ z_2 \end{bmatrix} = \begin{bmatrix} r_{1,1} & r_{1,2} \\ 0 & r_{2,2} \end{bmatrix} \begin{bmatrix} x_1 \\ x_2 \end{bmatrix} + \begin{bmatrix} n_1' \\ n_2' \end{bmatrix},$$

$$\begin{bmatrix} z_1' \\ z_2' \end{bmatrix} = \begin{bmatrix} r_{1,1}' & r_{1,2}' \\ 0 & r_{2,2}' \end{bmatrix} \begin{bmatrix} x_2 \\ x_1 \end{bmatrix} + \begin{bmatrix} n_1'' \\ n_2'' \end{bmatrix}$$ [6]

(Equation 7)

$$e_1 = |z_2 - r_{2,2}d_2|^2, \quad e_1' = |z_2' - r_{2,2}'d_1|^2$$ [7]

(Equation 8)

$$e_2 = |z_1 - r_{1,2}d_2 - r_{1,1}d_1|^2,$$
$$e_2' = |z_1' - r_{1,2}'d_1 - r_{1,1}'d_2|^2$$ [8]

Figure 6A:
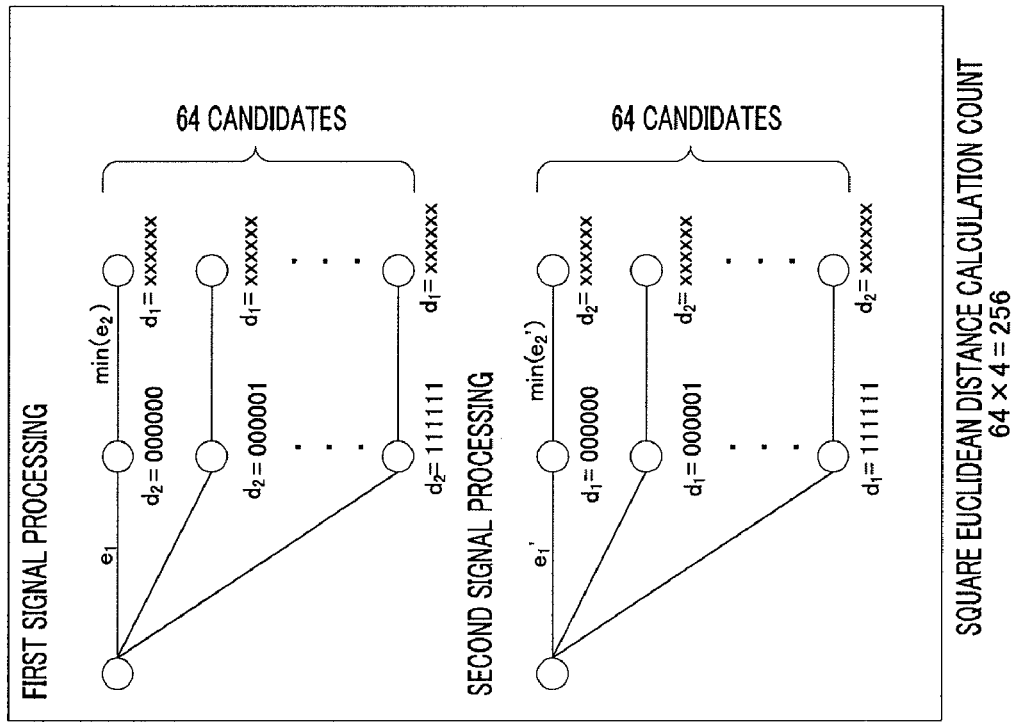
FIG. 6 illustrates square Euclidean distance calculation count in the signal demultiplexing apparatus according to Embodiment 1 of the present invention.
Figure 6B:
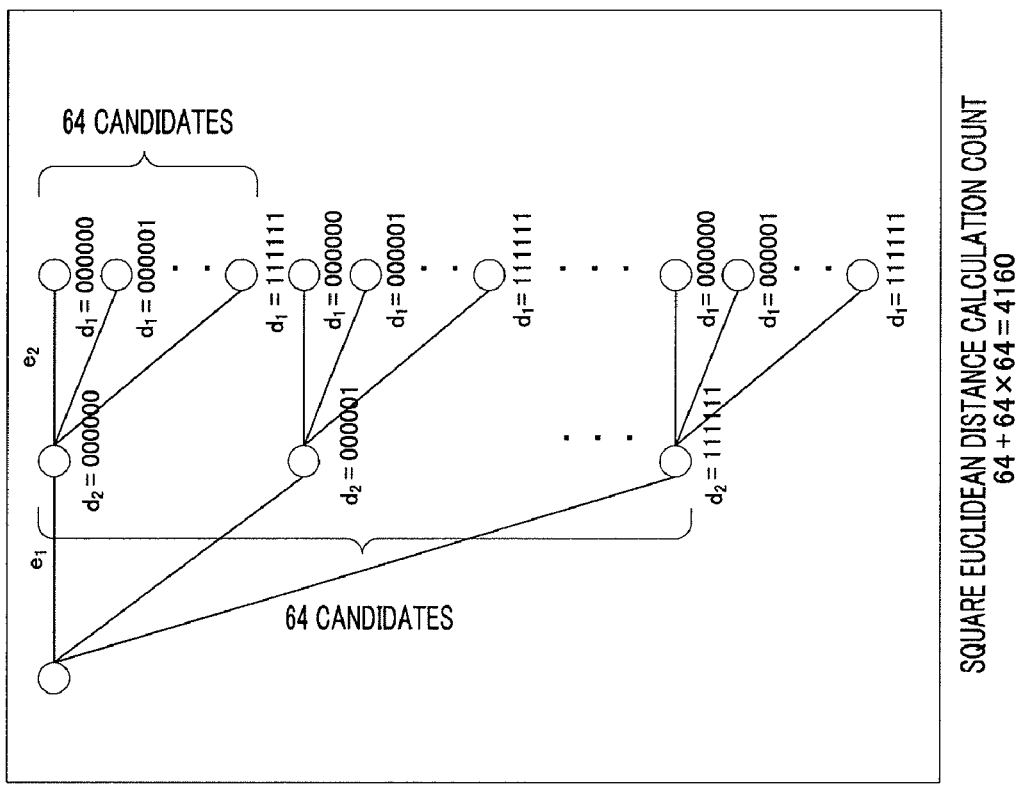

FIG. 6 illustrates the square Euclidean distance calculation count according to the present invention. Further, FIG. 6 compares the square Euclidean distance calculation counts between QR-MLD and the present invention in case where modulation count is m=6(64QAM), and FIG. 6A shows the square Euclidean distance calculation count according to the present invention and FIG. 6B shows the square Euclidean distance calculation count according to conventional QR-MLD.

According to the square Euclidean distance calculation count using conventional QR-MLD, as shown in FIG. 6B, it is necessary to calculate square Euclidean distances a number of times corresponding to an M-ary modulation value (corresponding to 64:$d_2$) and calculates in stage 2 square Euclidean distances a number of times corresponding to an M-ary modulation value (corresponding to 64:$d_1$) for symbol candidates $d_2$ in stage 1. Consequently, it is necessary to calculate square Euclidean distances 64(stage 1)+64×64(stage 2)=4160 times.

By contrast with this, the square Euclidean distance calculation in signal demultiplexing apparatus 100 according to the present invention is directed to calculating log likelihood ratios of only $d_2$ in first signal processing section 151. Consequently, as shown in FIG. 6A, one square Euclidean distance (i.e. the shortest branch min($e_2$) extending from given $d_2$) is calculated in stage 2 of first signal processing section 151 for each symbol candidate $d_2$ in stage 1. This is because, when log likelihood ratios of $d_2$ are calculated, square Euclidean distances other than the shortest square Euclidean distances ($e_1(d_2$=xxxxxx)+min($e_2(d_2$=xxxxxx))) are not used if square Euclidean distances are associated with same common $d_2$.

Next, in second signal processing section 152, symbol candidates introduced from stage 1 by rearranging components of the channel matrix become $d_1$ and, to calculate log likelihood ratios of only $d_1$, only one square Euclidean distance needs to be calculated in stage 2 for each symbol candidate $d_1$ in stage 1 as in first signal processing section 151.

According to the above result, it is possible to reduce the square Euclidean distance calculation count to 64 (stage 1 in first signal processing section 151)+64 (stage 2 in first signal processing section 151)+64 (stage 1 in second signal processing section 152)+64 (stage 2 in second signal processing section 152)=256.

Consequently, because square Euclidean distance calculating circuits occupy the circuit scale and current consumption in a QR-MLD circuit for the most part, the present invention is able to reduce the circuit scale and consumption current substantially by reducing the square Euclidean distance calculation count.

Further, although, in signal demultiplexing apparatus 100 according to above Embodiment 1, channel matrix rearranging section 110 generates a number of channel matrices corresponding to the number of transmission streams, at least two channel matrices of different symbol candidates in the final stage are required, and, therefore, the present invention is not limited to this number.

Embodiment 2

Figure 7:
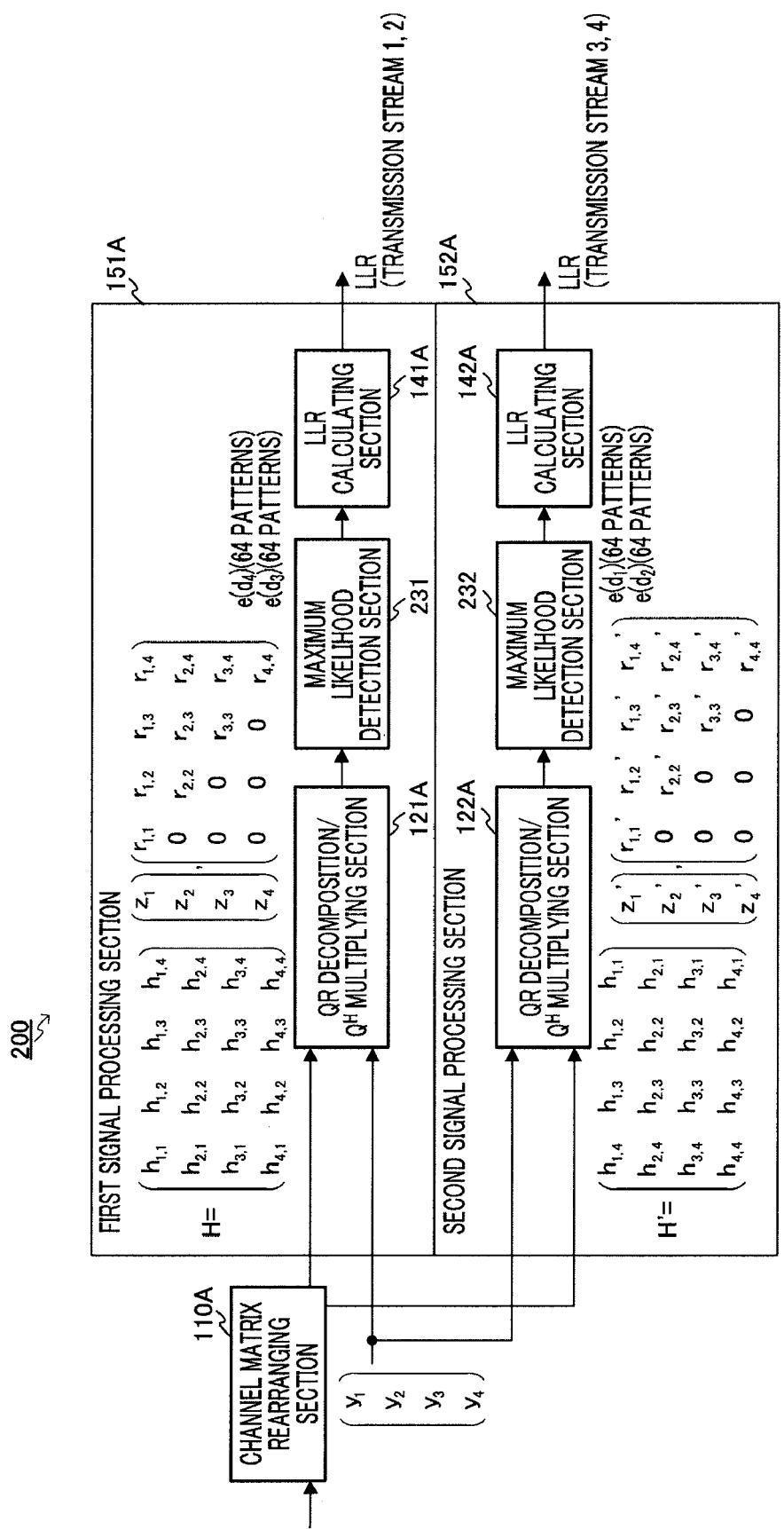
FIG. 7 is a block diagram showing a configuration of the signal demultiplexing apparatus according to Embodiment 2 of the present invention.
Figure 8:
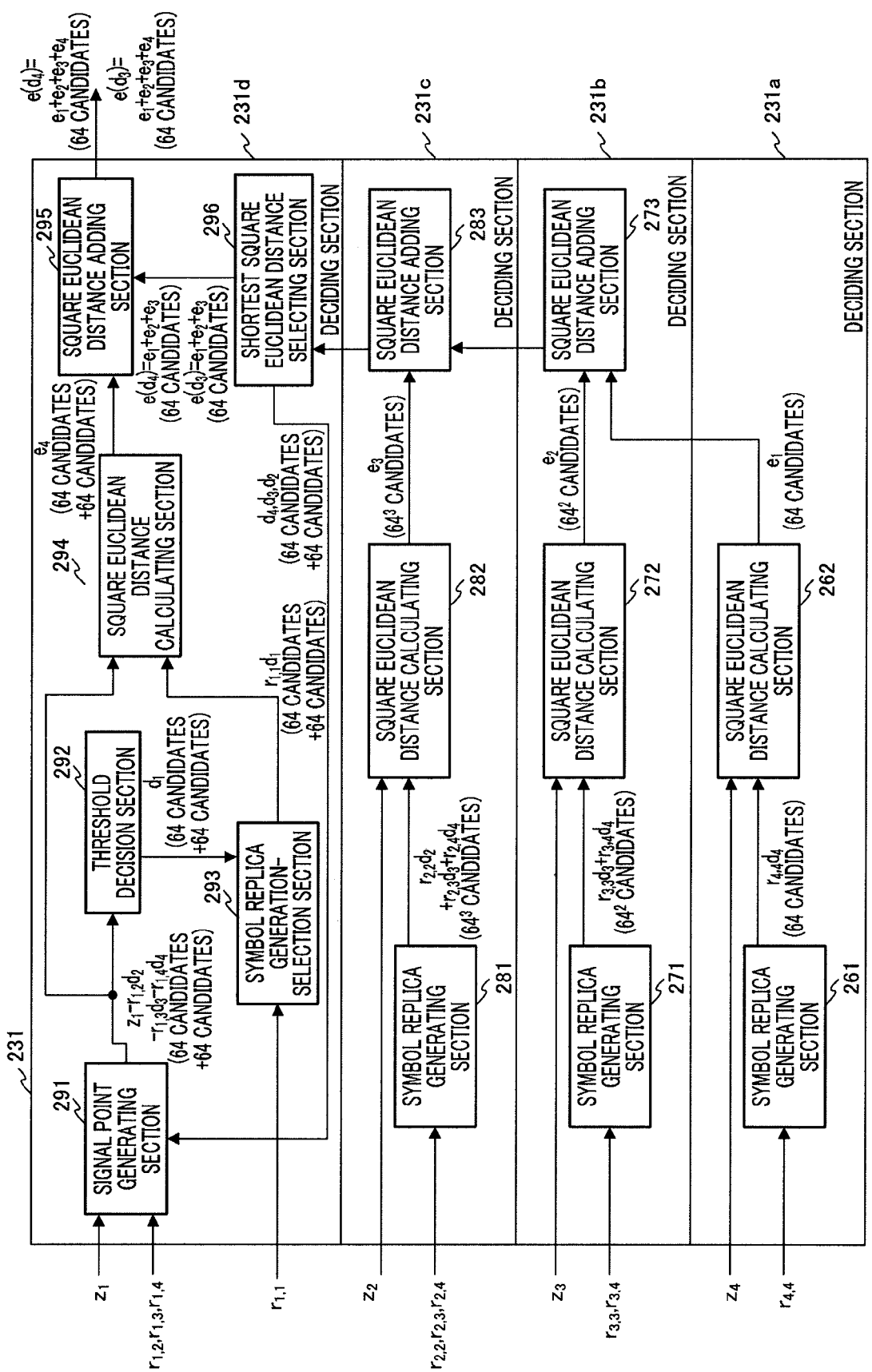
FIG. 8 is a block diagram showing a configuration of the maximum likelihood detection section of the first signal processing section shown in FIG. 7.
Figure 9:
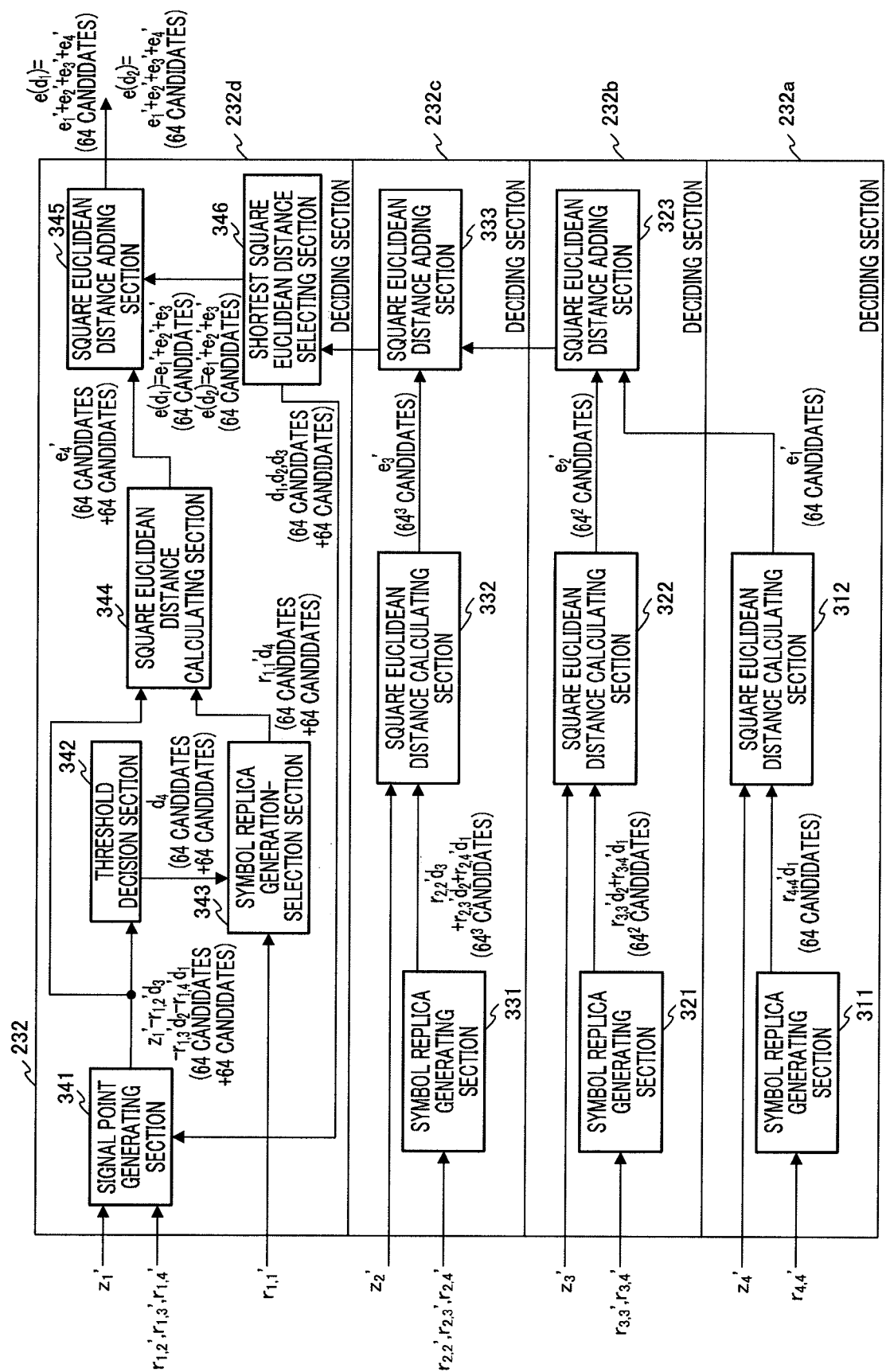
FIG. 9 is a block diagram showing a configuration of the maximum likelihood detection section of the second signal processing section shown in FIG. 7.

Using FIG. 7 to FIG. 9, the signal demultiplexing apparatus according to Embodiment 2 of the present invention will be described. FIG. 7 is a block diagram showing a configuration of signal demultiplexing apparatus 200 according to Embodiment 2 of the present invention, FIG. 8 is a block diagram showing a configuration of the maximum likelihood detection section of the first signal processing section shown in FIG. 7 and FIG. 9 is a block diagram showing a configuration of the maximum likelihood detection section of the second signal processing section shown in FIG. 7.

Compared to corresponding signal demultiplexing apparatus 100 of Embodiment 1 shown in FIG. 2 to FIG. 5, this signal demultiplexing apparatus 200 of Embodiment 2 receives as input four signals and has practically the same basic configuration except that the number of deciding sections of maximum likelihood detection sections 231 and 232 in signal processing sections 151A and 152A is different.

Therefore, the different configuration of the maximum likelihood detection section will be described in detail, and other same components will be assigned the same names and same reference numerals and description thereof will be omitted.

Assuming that 4×4 MIMO and 64 QAM are applied, the signal demultiplexing apparatus according to Embodiment 2 has two sequences of signal processing sections 151A and 152A including channel matrix rearranging section 110A of the same configuration as channel matrix rearranging section 110, QR decomposition/$Q^H$ multiplying sections 121A and 122A, maximum likelihood detection (MLD) sections 231 and 232 and LLR calculating sections 141A and 142A. Further, these two sequences of signal processing sections (here, first signal processing section 151A and second signal processing section 152A having the same basic configuration as in description of Embodiment 1) may carry out two sequences of processings in time sequence in the same processing section as in Embodiment 1. Further, a plurality of signal processings sections may employ a configuration of including a number of signal processing sections corresponding to the number of transmission streams. Here, for four transmission streams, using two first signal processing section 151A and second signal processing section 152A, processing with respect to transmission streams 1 and 2 is carried out in signal processing section 151A and processing with respect to transmission streams 3 and 4 is carried out in second signal processing section 152A.

Similar to channel matrix rearranging section 110 of Embodiment 1, channel matrix rearranging section 110A in this signal demultiplexing apparatus 200 of Embodiment 2 generates a plurality of matrices by rearranging elements of a channel estimation matrix of received signals to be multiplied upon symbol candidates in the final stage.

Here, two matrices of channel matrix H and channel matrix H' generated by rearranging row vectors $(h_{1,1}, h_{2,1}, h_{3,1}, h_{4,1})$, which are transmission stream components of channel matrix H, by other row vectors, are generated and outputted to first signal processing section 151A and second signal processing section 152A, respectively.

To be more specific, as matrices generated by rearranging elements of a channel estimation matrix, channel matrix rearranging section 110A in signal demultiplexing apparatus 200 of Embodiment 2 generates two matrices such that the first (leftmost) row vector is arranged to vary in the channel estimation matrix. Here, to receive four transmission signals, two matrices in which row vectors associated with respective transmission streams among four transmission streams are placed in the first row vector of the channel estimation matrix, are generated. In this case, as for the row vectors other than the first row vector, row vectors associated with the rest of transmission streams may be arranged in any way.

The two matrices generated in this way are inputted in signal processing sections 151A and 152A, and, in signal processing sections 151A and 152A, maximum likelihood detection sections 231 and 232 calculate square Euclidean distances using signals processed by QR decomposition/$Q^H$ multiplying sections 121A and 122A similar to QR decomposition/$Q^H$ multiplying sections 121 and 122, and, similar to LLR calculating sections 141 and 142, LLR calculating sections 141A and 142A calculate the log likelihood ratio of each bit of symbol candidates in each stage. Here, LLR calculating section 141A of first signal processing section 151A calculates the log likelihood ratio (LLR) of each bit of symbol candidates $d_4$ and $d_3$ in stages 1 and 2 and calculates the log likelihood ratio (LLR) of each bit of symbol candidates $d_1$ and $d_2$ in stages 1 and 2.

Further, maximum likelihood detection sections 231 and 232 calculate, in the final stage in particular (stage 4 here), only volumes showing square Euclidean distances between signal points of when combinations of symbol candidates up to the stage immediately before the final stage (stages 1 to 3 here) are fixed and candidate points in the final stage closest to the signal points, and outputs the volumes to LLR calculating sections 141A and 142A.

Maximum likelihood detection section 231 will be described here.

Using received signal Z and matrix R received as input from QR decomposition/$Q^H$ multiplying section 121A, maximum likelihood detection section 231 calculates volumes showing square Euclidean distances in a number of stages corresponding to the number of transmission streams received (4 stages here).

In maximum likelihood deciding section 231, first deciding section 231a to third deciding section 231c associated with stages 1 to 3 operate as in general QR-MLD. To be more specific, first deciding section 231a is associated with stage 1, second deciding section 231b is associated with stage 2, third deciding section 231c is associated with stage 3 and fourth deciding section 231d is associated with stage 4. Further, there are cases below where first deciding section 231a to fourth deciding section 231d are each simply referred to as a "deciding section."

That is, symbol replica generating section 261 of deciding section 231a shown in FIG. 8 is the same as symbol replica generating section 161 shown in FIG. 3 and square Euclidean distance calculating section 262 is the same as in square Euclidean distance calculating section 162. Further, symbol replica generating sections 271 and 281 in deciding sections 231b and 231c similarly have the same function as symbol replica generating section 161 shown in FIG. 3, and, similarly, square Euclidean distance calculating sections 272 and 282 are the same as square Euclidean distance calculating section 162. Further, square Euclidean distance adding sections 273 and 283 have the same function as in square Euclidean distance adding section 167.

Deciding section 231d associated with stage 4, the final stage, has signal point generating section 291, threshold decision section 292, symbol replica generation-selection section 293, square Euclidean distance calculating section 294, square Euclidean distance adding section 295 and shortest square Euclidean distance selecting section 296.

This deciding section 231d differs from deciding section 131b associated with the final stage of maximum likelihood detection section 131 of FIG. 3 in having shortest square Euclidean distance selecting section 296.

This shortest square Euclidean distance selecting section 296 selects the minimum value from $64^2$ square Euclidean distances of the same value of symbol candidate $d_4$ in first deciding section 231a associated with stage 1, and outputs the minimum value to square Euclidean distance adding section 295. Similarly, shortest square Euclidean distance selecting section 296 selects the minimum value from $64^2$ square Euclidean distances of the same value of symbol candidate $d_3$ in second deciding section 231b associated with stage 2, and outputs the minimum value to square Euclidean distance adding section 295. Further, although two LLR's are calculated in two circuits (i.e. signal processing sections), three LLR's may be calculated in one circuit and one LLR may be calculated in one circuit. Further, shortest square Euclidean distance selecting section 296 outputs combinations of $d_4$, $d_3$ and $d_2$ associated with the selected minimum value to signal point generating section 291. Further, this shortest square Euclidean distance selecting section 296 is not provided in signal demultiplexing apparatus 100 of Embodiment 1. This is because signal demultiplexing apparatus 100 employs 2×2 MIMO and there is no square Euclidean distance of the same value of symbol candidate $d_2$ in stage 1.

Signal point generating section 291 has the same basic function as in signal point generating section 163, and generates signal points $z_1 - r_{1,2}d_2 - r_{1,3}d_3 - r_{1,4}d_4$ associated with combinations of symbol candidates $d_4$, $d_3$ and $d_2$ (64+64 combinations) using received signal $z_1$ received as input, matrix R elements $r_{1,2}$, $r_{1,3}$ and $r_{1,4}$ and combinations of symbol candidates $d_4$, $d_3$ and $d_2$ (64+64 combinations) from shortest Euclidean distance selecting section 296. Subsequent processings are the same as processings of 2×2 MIMO of Embodiment 1, and description thereof will be omitted.

That is, threshold decision section 292, symbol replica generation-selection section 293, square Euclidean distance calculating section 294 and square Euclidean distance adding section 295 have the same configurations and carry out the same processings as threshold decision section 164, symbol replica generation-selection section 165, square Euclidean distance calculating section 166 and square Euclidean distance adding section 167 shown in FIG. 3.

Using received signal Z' and matrix R' received as input from QR decomposition/$Q^H$ multiplying section 122A, maximum likelihood detection section 232 calculates volumes showing square Euclidean distances in a number of stages corresponding to the number of transmission streams to be received (here, in four stages).

In maximum likelihood detection section 232, the operations of first deciding section 232a to third deciding section 232c associated with stages 1 to 3, respectively, are the same as in general QR-MLD similar to first deciding section 231a to third deciding section 231c in maximum likelihood detection section 231. To be more specific, first deciding section 232a is associated with stage 1, second deciding section 232b is associated with stage 2, third deciding section 232c is associated with stage 3 and fourth deciding section 232d is associated with stage 4, the final stage. Further, first deciding section 232a to fourth deciding section 232d are each simply referred to as a "deciding section" below.

This maximum likelihood detection section 232 basically has the same configuration as maximum likelihood detection section 231 and only a matrix received as input is different compared to maximum likelihood detection section 231. Maximum likelihood detection section 232 carries out the same processing as in maximum likelihood detection section 231 using a matrix different from the matrix inputted in maximum likelihood detection section 231.

That is, symbol replica generating section 311 of deciding section 232a shown in FIG. 9 is the same as symbol replica generating section 261 shown in FIG. 8, and square Euclidean distance calculating section 312 is the same as square Euclidean distance calculating section 262. Further, similarly, symbol replica generating sections 321 and 331 in deciding sections 232b and 232c have the same functions as in symbol replica generating sections 271 and 281 shown in FIG. 8, and, similarly, square Euclidean distance calculating sections 322 and 332 have the same functions as in square Euclidean distance calculating sections 272 and 282. Further, square Euclidean distance adding sections 323 and 333 have the same functions as in square Euclidean distance adding sections 273 and 283.

Deciding section 232d associated with stage 4, the final stage, is configured as in deciding section 231d (see FIG. 8), and has signal point generating section 341, threshold decision section 342, symbol replica generation-selection section 343, square Euclidean distance calculating section 344, square Euclidean distance adding section 345 and shortest square Euclidean distance selecting section 346.

That is, this deciding section 232d differs from deciding section 132b associated with the final stage of maximum likelihood detection section 132 of FIG. 5 in having shortest square Euclidean distance selecting section 346 as in deciding section 231d.

This shortest square Euclidean distance selecting section 346 selects the minimum value from $64^2$ square Euclidean distances of the same value of symbol candidate $d_1$ in first deciding section 232a associated with stage 1, and outputs the minimum value to square distance adding section 345. Similarly, shortest square Euclidean distance selecting section 346 selects the minimum value from $64^2$ square Euclidean distances of the same value of common symbol candidate $d_2$ in second deciding section 232b associated with stage 2, and outputs the minimum value to square Euclidean distance adding section 345.

Further, shortest square Euclidean distance selecting section 296 outputs combinations of $d_1$, $d_2$ and $d_3$ (64+64 candidates) associated with the selected minimum value, to signal point generating section 341. Further, this shortest square Euclidean distance selecting section 346 is not provided in signal demultiplexing apparatus 100 of Embodiment 1. This is because signal demultiplexing apparatus 100 employs 2×2 MIMO and there is no square Euclidean distance of the same value of symbol candidate $d_2$ in stage 1.

Signal point generating section 341 has the same basic function as in signal point generating section 173, and generates signal points $z_1' - r_{1,2}'d_3 - r_{1,3}'d_2 - r_{1,4}'d_1$ associated with combinations of symbol candidates $d_1$, $d_2$ and $d_3$ (64+64 combinations) using received signal $z_1'$ received as input, matrix R elements $r_{1,2}'$, $r_{1,3}'$ and $r_{1,4}'$ and combinations of symbol candidates $d_1$, $d_2$ and $d_3$ (64+64 combinations) from shortest Euclidean distance selecting section 346. Subsequent processings are the same as processings of 2×2 MIMO of Embodiment 1 and description thereof will be omitted.

That is, threshold decision section 342, symbol replica generation-selection section 343, square Euclidean distance calculating section 344 and square Euclidean distance adding section 345 have the same configurations and carry out the same processings as threshold decision section 174, symbol replica generation-selection section 175, square Euclidean distance calculating section 176 and square Euclidean distance adding section 177 shown in FIG. 3.

Next, characteristic points of the operation of maximum likelihood detection section 231 will be described.

In deciding section 231 associated with stage 4, the final stage, shortest square Euclidean distance selecting section 296 selects the minimum value from $64^2$ (corresponding to the number of symbol points $d_3$×the number of symbol points $d_2$) of the same value of symbol point $d_4$ (sixty four candidates for 64 QAM) in stage 1, and outputs the minimum value to square Euclidean distance adding section 295. Similarly, shortest square Euclidean distance selecting section 296 selects the minimum value from $64^2$ (corresponding to the number of symbol points $d_4$×the number of symbol points $d_2$) square Euclidean distances of the same value of symbol point $d_3$ (64 candidates for 64 QAM) in stage 2, and outputs the minimum value to square Euclidean distance adding section 295.

Further, shortest square Euclidean distance selecting section 296 outputs combinations of symbol candidates $d_4$, $d_3$ and $d_2$ (64+64 candidates) associated with the minimum value.

Signal point generating section 291 receives as input received signal $Z_1$ and matrix R element $r_{1,2}$, $r_{1,3}$ and $r_{1,4}$ and generates signal points $z_1 - r_{1,2}d_2 - r_{1,3}d_3 - r_{1,4}d_4$ for combinations $d_4$, $d_3$ and $d_2$ (64+64 candidates) received as input from shortest square Euclidean distance selecting section 296. The subsequent processings are the same as in 2×2 MIMO.

Further, maximum likelihood detection section 232 basically carries out the same operation as in maximum likelihood deciding section 231 and, therefore, description thereof will be omitted.

Consequently, according to Embodiment 2, the square Euclidean distance calculation count can be reduced to $532864 (= (64(\text{stage } 1) + 64^2(\text{stage } 2) + 64^3(\text{stage } 3) + 2 \times 64(\text{stage } 4)) \times 2(\text{first and second signal processing sections } 151 \text{ and } 152))$, compared to the conventional QR-MLD method where the square Euclidean distance calculation count is $64 + 64^2 + 64^3 + 64^4 = 17043520$, so that, accompanying this, it is possible to reduce the circuit scale and current consumption in the QR-MLD circuit substantially.

In other words, the signal demultiplexing apparatus of Embodiment 2 is able to reduce the amount of operation to $\{(2^m) + (2^m)2 + (2^m)3 + \ldots + (2^m)^{X-1} + (X/2) \times (2^m)\} \times 2$ times (X: the number of transmitting antennas) from $\{(2^m) + (2^m)2 + (2^m)^3 + \ldots + (2^m)^X\}$ times according to QR-MLD. Consequently, by lowering the probability that there is no bit likelihood while reducing the amount of operation, it is possible to reduce the amount of operation and improve communication quality.

Each function block employed in the description of each of the aforementioned embodiments may typically be implemented as an LSI constituted by an integrated circuit. These may be individual chips or partially or totally contained on a single chip. "LSI" is adopted here but this may also be referred to as "IC," "system LSI," "super LSI," or "ultra LSI" depending on differing extents of integration. Further, the method of circuit integration is not limited to LSI's, and implementation using dedicated circuitry or general purpose processors is also possible. After LSI manufacture, utilization of a programmable FPGA (Field Programmable Gate Array) or a reconfigurable process or where connections and settings of circuit cells within an LSI can be reconfigured is also possible. Further, if integrated circuit technology comes out to replace LSI's as a result of the advancement of semiconductor technology or a derivative other technology, it is naturally also possible to carry out function block integration using this technology. For example, application of biotechnology is also possible.

Further, an aspect of the above-described present invention is the signal demultiplexing apparatus that is used in a wireless receiving apparatus of the MIMO scheme and that carries out signal demultiplexing in a plurality of stages according to the MLD scheme involving QR decomposition, may include: a channel matrix generating means that generates a plurality of matrices by rearranging elements of a channel estimation matrix multiplied upon symbol candidates in the final stage; a QR decomposition means that performs QR decomposition using a plurality of generated matrices and calculates unitary matrices and upper triangular matrices associated with the generated matrices; an orthogonalizing means that multiplies a transpose matrix of the unitary matrix, which is based on the matrix, and a received signal for each generated matrix; and a maximum likelihood detection means that, using calculation results in the QR decomposition means and the orthogonalizing means, calculates in the final stage only volumes showing square Euclidean distances between signal points of when combinations of symbol candidates up to the stage immediately be fore the final stage are fixed and candidate points in the final stage that is closest to the signal points. Further, the present invention may further include a likelihood calculating means that, using the calculated volumes showing the square Euclidean distances, calculates log likelihood ratios of only the symbol candidates for each generated matrix.

The disclosure of Japanese Patent Application No. 2006-259710, filed on Sep. 25, 2006, including the specification, drawings and abstract, is incorporated herein by reference in its entirety.

INDUSTRIAL APPLICABILITY

The signal demultiplexing apparatus and signal demultiplexing method according to the present invention provide an advantage of reducing the amount of operation while maintaining communication quality and is particularly suitable for use in a wireless receiving apparatus that carries out MIMO communication.

The invention claimed is:

1. A signal demultiplexing apparatus that is used in a wireless receiving apparatus of a multi-input and multi-output scheme and that carries out signal demultiplexing in two stages according to a maximum likelihood detection scheme, the signal demultiplexing apparatus comprising:

a channel matrix rearranging section that generates a second channel estimation matrix by rearranging rows of a first channel estimation matrix;

a decomposition section that performs QR decomposition using the first and second channel estimation matrices and calculates a unitary matrix and a triangular matrix of each of the first and second channel estimation matrices;

a multiplying section that multiplies a conjugate transpose matrix of the unitary matrix and a received signal for each of the first and second channel estimation matrices and calculates a first received signal after orthogonalization and a second received signal after orthogonalization;

a maximum likelihood detection section that:

calculates a distance using a first transmission signal candidate and the first received signal after orthogonalization in a first stage for each first transmission signal candidate;

determines a second transmission signal candidate by performing threshold decision for each first transmission signal candidate in a second stage and, further, calculates, for each first transmission signal candidate, a distance using the first transmission signal candidate, the second received signal after orthogonalization and the second transmission signal candidate determined with respect to the first transmission signal candidate; and adds the distance calculated in the first stage and the distance calculated in the second stage for each first transmission signal candidate and outputs an addition result associated in a one-to-one correspondence with each first transmission signal candidate; and a log likelihood ratio calculating section that selects from the addition result a shortest distance in case where a bit of the first transmission signal candidate is zero and a shortest distance in case where the bit of the first transmission signal candidate is one and calculates a log likelihood ratio based on the selected shortest distance in case where the bit is zero and the selected shortest distance in case where the bit is one.

2. A signal demultiplexing method that is used in a wireless receiving apparatus of a multi-input and multi-output scheme and that carries out signal demultiplexing in two stages according to a maximum likelihood detection scheme, the signal demultiplexing method comprising:
- a channel matrix rearranging step of generating a second channel estimation matrix by rearranging rows of a first channel estimation matrix;
- a decomposition step of performing QR decomposition using the first and second channel estimation matrices, and calculating a unitary matrix and a triangular matrix of each of the first and second channel estimation matrices;
- a multiplying step of multiplying a conjugate transpose matrix of the unitary matrix and a received signal for each of the first and second channel estimation matrices and calculating a first received signal after orthogonalization and a second received signal after orthogonalization;
- a maximum likelihood detection step of:
- calculating a distance using a first transmission signal candidate and the first received signal after orthogonalization in a first stage for each first transmission signal candidate;
- determining a second transmission signal candidate by performing threshold decision for each first transmission signal candidate in a second stage and, further, calculating, for each first transmission signal candidate, a distance using the first transmission signal candidate, the second received signal after orthogonalization and the second transmission signal candidate determined with respect to the first transmission signal candidate; and
- adding the distance calculated in the first stage and the distance calculated in the second stage for each first signal transmission signal candidate and outputting an addition result associated in a one-to-one correspondence with each first transmission signal candidate; and
- a log likelihood ratio calculating step of selecting from the addition result a shortest distance in case where a bit of the transmission signal candidate is zero and a shortest distance in case where the bit of the transmission signal candidate is one and calculating a log likelihood ratio based on the selected shortest distance in case where the bit is zero and the shortest distance in case where the bit is one.

3. A signal demultiplexing apparatus that is used in a wireless receiving apparatus of a multi-input and multi-output scheme and that carries out signal demultiplexing in m stages (where m≧3) according to a maximum likelihood detection scheme, the signal demultiplexing apparatus comprising:
- a channel matrix rearranging section that generates a second channel estimation matrix by rearranging at least a first row of a first channel estimation matrix by a different random row;
- a decomposition section that performs QR decomposition using the first and second channel estimation matrices and calculates a unitary matrix and a triangular matrix of each of the first and second channel estimation matrices;
- a multiplying section that multiplies a conjugate transpose matrix of the unitary matrix and a received signal for each of the first and second channel estimation matrices and calculates m received signals after orthogonalization;
- a maximum likelihood detection section that:
- calculates a distance using (m−1) transmission signal candidates and the m received signals after orthogonalization in each stage before a final stage for each combination of the (m−1) transmission signal candidates;
- determines m transmission signal candidates by performing threshold decision for each combination of the (m−1) transmission signal candidates in the final stage and, further, calculates, for each combination of the (m−1) transmission signal candidates, a distance using each combination of the (m−1) transmission signal candidates, the m received signals after orthogonalization and the m transmission signal candidates determined with respect to each combination of the (m−1) transmission signal candidates; and
- adds the distance calculated in each stage before the final stage and the distance calculated in the final stage for each combination of the (m−1) signal transmission signal candidates and outputs an addition result associated in a one-to-one correspondence with each combination of the (m−1) transmission signal candidates; and
- a log likelihood ratio calculating section that selects from the addition result a shortest distance in case where a bit of each of the (m−1) transmission signal candidates is zero and a shortest distance in case where the bit of each of the (m−1) transmission signal candidates is one and calculates a log likelihood ratio based on the selected shortest distance in case where the bit is zero and the shortest distance in case where the bit is one.

4. A signal demultiplexing method that is used in a wireless receiving apparatus of a multi-input and multi-output scheme and that carries out signal demultiplexing in m stages (where m≧3) according to a maximum likelihood detection scheme, the signal demultiplexing method comprising:
- a channel matrix rearranging step of generating a second channel estimation matrix by rearranging at least a first row of a first channel estimation matrix by a different random row;
- a decomposition step of performing QR decomposition using the first and second channel estimation matrices and calculating a unitary matrix and a triangular matrix of each of the first and second channel estimation matrices;
- a multiplying step of multiplying a conjugate transpose matrix of the unitary matrix and a received signal for each of the first and second channel estimation matrices and calculating m received signals after orthogonalization;
- a maximum likelihood detection step of:
- calculating a distance using (m−1) transmission signal candidates and the m received signals after orthogonalization in each stage before a final stage for each combination of the (m−1) transmission signal candidates;
- determining m transmission signal candidates by performing threshold decision for each combination of the (m−1) transmission signal candidates in the final stage and, further, calculating, for each combination of the (m−1) transmission signal candidates, a distance using each combination of the (m−1) transmission signal candidates, the m received signals after orthogonalization and the m transmission signal candidates determined with respect to each combination of the (m−1) transmission signal candidates; and
- adding the distance calculated in each stage before the final stage and the distance calculated in the final stage for each combination of the (m−1) signal transmission signal candidates and outputting an addition result associated in a one-to-one correspondence with each combination of the (m−1) transmission signal candidates; and a log likelihood ratio calculating step of selecting from the addition result a shortest distance in case where a bit of each of the (m−1) transmission signal candidates is zero and a shortest distance in case where the bit of each of the (m−1) transmission signal candidates is one and calculating a log likelihood ratio based on the selected shortest distance in case where the bit is zero and the shortest distance in case where the bit is one.

* * * * *